United States Patent [19]

Slade et al.

[11] Patent Number: 4,671,772

[45] Date of Patent: Jun. 9, 1987

[54] PERFORMANCE APPRAISAL AND TRAINING SYSTEM AND METHOD OF UTILIZING SAME

[75] Inventors: Michael G. Slade; John M. Moscicki, both of San Francisco, Calif.; John F. Greene, Milford, Conn.

[73] Assignee: Keilty, Goldsmith & Boone, La Jolla, Calif.

[21] Appl. No.: 790,297

[22] Filed: Oct. 22, 1985

[51] Int. Cl.$^4$ .............................................. G09B 7/00
[52] U.S. Cl. .................................... 434/219; 434/236; 434/307; 434/322; 434/350
[58] Field of Search ............... 434/219, 236, 307, 308, 434/322, 350, 351

[56] References Cited

U.S. PATENT DOCUMENTS 3,654,708  4/1972  Brudner .............................. 434/307
3,729,581  4/1973  Anderson ........................... 434/307
4,490,810  12/1984  Hon .................................... 434/308

Primary Examiner—Leo P. Picard
Attorney, Agent, or Firm—Bernard L. Kleinke

[57] ABSTRACT

A performance appraisal and training system employs a survey arrangement for procuring performance appraisal data indicative of the performance of a user to be trained, and a data delivery medium for providing computer-readable compiled performance data signals indicative of compiled performance data of the user. Feedback presentation memory components are provided for storing prerecorded feedback display signals indicative of a group of motion picture vignettes illustrative of various situations resulting from various types of performances. A computer responds to the performance data signals and to the display signals for displaying to the user both the compiled performance data and selected corresponding ones of stored motion picture vignettes to illustrate situations resulting from the past performance of the user.

21 Claims, 28 Drawing Figures

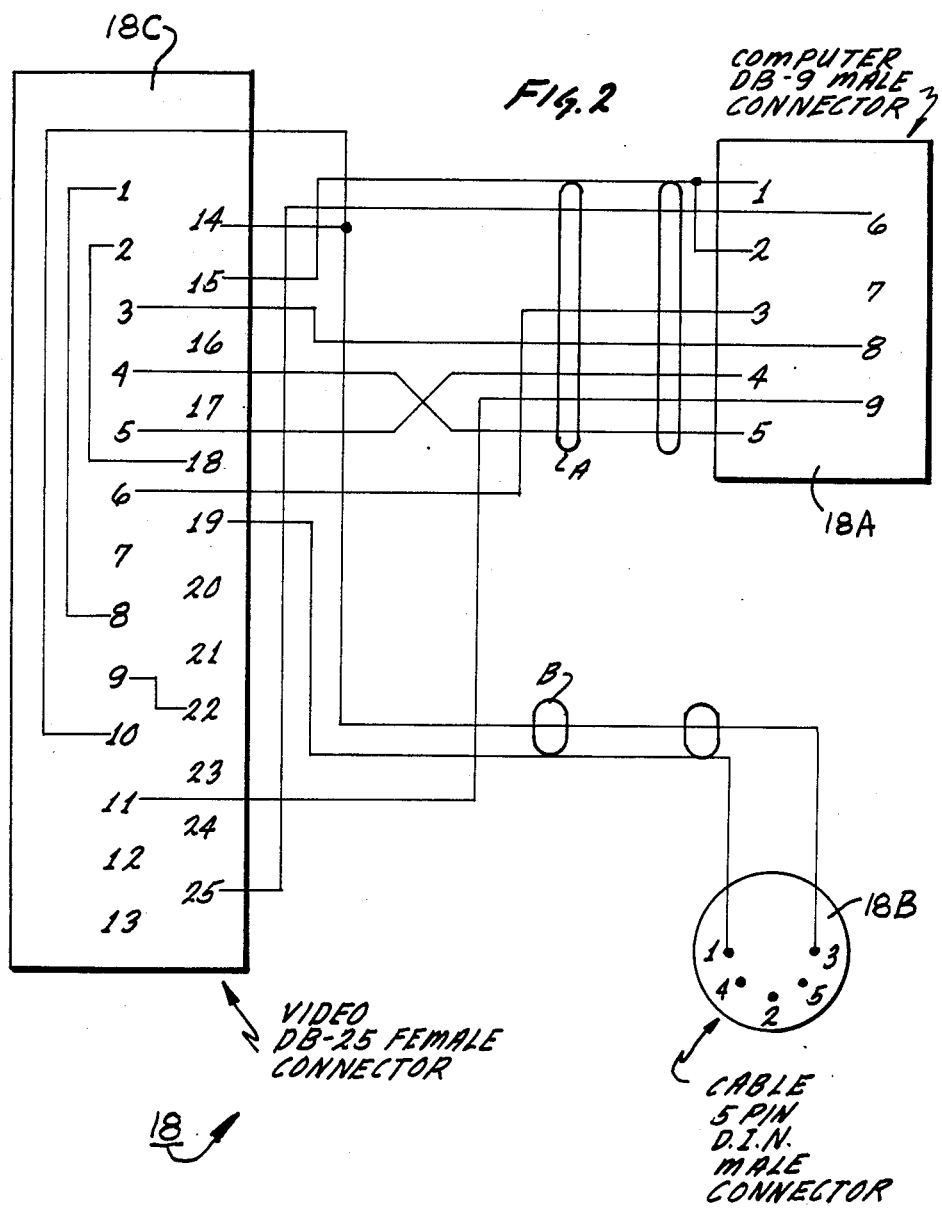

FIG 3a

CONSIDER YOUR OWN EFFECTIVENESS IN THE FOLLOWING ACTIVITIES.
HOW SATISFIED ARE OTHERS WITH THE WAY YOU ...

|   |   | VERY SATISFIED | SATISFIED | NEITHER SATISFIED NOR DISSATISFIED | DISSATISFIED | VERY DISSATISFIED |
|---|---|---|---|---|---|---|
| 1. | MAKE SURE THE RULES ARE CLEARLY UNDERSTOOD? | VS | S | N | D | VD |
| 2. | KNOW WHO OUR CUSTOMERS ARE? | VS | S | N | D | VD |
| 3. | KNOW AND SUPPORT THE MISSION OF THE OVERALL ORGANIZATION? | VS | S | N | D | VD |
| 4. | STAND UP FOR YOUR PERSONAL BELIEFS? | VS | S | N | D | VD |
| 5. | CONSISTENTLY SHOW RESPECT AND CONCERN FOR PEOPLE AS INDIVIDUALS? | VS | S | N | D | VD |
| 6. | GIVE APPROPRIATE ORIENTATION TO PEOPLE IN NEW ASSIGNMENTS? | VS | S | N | D | VD |
| 7. | CONSISTENTLY TREAT THE USERS OF OUR PRODUCTS/SERVICES AS A TOP PRIORITY? | VS | S | N | D | VD |
| 8. | DESCRIBE HIGHER LEVEL MANAGERS IN A POSITIVE WAY? | VS | S | N | D | VD |
| 9. | SHOW A HIGH DEGREE OF PERSONAL INTEGRITY IN DEALING WITH OTHERS? | VS | S | N | D | VD |
| 10. | COLLABORATE APPROPRIATELY IN SETTING OBJECTIVES? | VS | S | N | D | VD |
| 11. | EFFECTIVELY ANALYZE PERFORMANCE? | VS | S | N | D | VD |

| | |
|---|---|
| 12. KEEP THE WORK SIMPLE ENOUGH TO BE UNDERSTOOD AND IMPLEMENTED? | VS S N D VD |
| 13. UNDERSTAND THE BASIC VALUES OF THE ORGANIZATION? | VS S N D VD |
| 14. ENCOURAGE AND ACCEPT CONSTRUCTIVE CRITICISM? | VS S N D VD |
| 15. DELEGATE WHEN YOU SHOULD? | VS S N D VD |
| 16. ENCOURAGE SUGGESTIONS FOR IMPROVING PRODUCTIVITY? | VS S N D VD |
| 17. COMMUNICATE A POSITIVE SENSE OF URGENCY ABOUT GETTING THE JOB DONE? | VS S N D VD |
| 18. ENCOURAGE EFFORTS TO SIMPLIFY PROCEDURES? | VS S N D VD |
| 19. ARE DEDICATED TO MEETING THE NEEDS OF PEOPLE WHO USE OUR SERVICES/PRODUCTS? | VS S N D VD |
| 20. DISCOURAGE DESTRUCTIVE COMMENTS ABOUT THE ORGANIZATION? | VS S N D VD |
| 21. TAKE RESPONSIBILITY AND OWNERSHIP FOR YOUR DECISIONS? | VS S N D VD |
| 22. GIVE POSITIVE RECOGNITION FOR ACHIEVEMENT WITHOUT DISCOMFORT TO EITHER PARTY? | VS S N D VD |
| 23. TAKE THE TIME TO ANSWER QUESTIONS AND EXPLAIN DECISIONS? | VS S N D VD |
| 24. TIE INDIVIDUAL OBJECTIVES TO LARGER ORGANIZATIONAL GOALS? | VS S N D VD |
| 25. CLEARLY COMMUNICATE THE IMPORTANCE OF PEOPLE WHO USE OUR PRODUCTS/SERVICES? | VS S N D VD |

FIG 3b

| | |
|---|---|
| 37. Give specific directions when needed? | VS S N D VD |
| 38. Encourage and listen to input from the people who use our services/products? | VS S N D VD |
| 39. Are honest and positive in describing organizational benefits? | VS S N D VD |
| 40. Take reasonable risks in trying out your new ideas? | VS S N D VD |
| 41. Adequately reward and reinforce top performance? | VS S N D VD |
| 42. Build people's ability and understanding? | VS S N D VD |
| 43. Concentrate on achieving what is most important? | VS S N D VD |
| 44. Do not allow destructive comments about the people who use our products/services? | VS S N D VD |
| 45. Personally support higher level management decisions? | VS S N D VD |
| 46. Demonstrate confidence in yourself as a manager? | VS S N D VD |
| 47. Build and maintain people's confidence? | VS S N D VD |
| 48. Strive to improve people's performance from acceptable to excellent? | VS S N D VD |
| 49. Encourage others to operate using the basic values of the organization? | VS S N D VD |
| 50. Act on constructive advice in a timely manner? | VS S N D VD |

FIG 4b

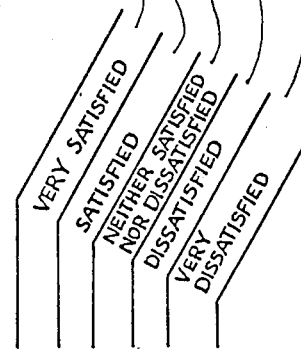

| | |
|---|---|
| 62. ARE MORE COMMITTED TO CUSTOMERS' (USERS') LONG-TERM SATISFACTION THAN OUR SHORT-TERM GAIN? | VS S N D VD |
| 63. DO NOT "PASS THE BUCK" OR BLAME HIGHER LEVEL MANAGEMENT? | VS S N D VD |
| 64. AVOID DESTRUCTIVE SELF-CRITICISM? | VS S N D VD |
| 65. PROVIDE CONTINUING SUPPORT WHEN IT IS NEEDED? | VS S N D VD |
| 66. GIVE DEVELOPMENTAL PERFORMANCE FEEDBACK IN A TIMELY MANNER? | VS S N D VD |
| 67. TAKE CORRECTIVE ACTION WHEN BASIC ORGANIZATIONAL VALUES ARE COMPROMISED? | VS S N D VD |
| 68. DO NOT DISCOURAGE PEOPLE FROM GIVING YOU CONSTRUCTIVE CRITICISM? | VS S N D VD |
| 69. TAKE APPROPRIATE RISKS IN LETTING OTHERS MAKE DECISIONS? | VS S N D VD |
| 70. AVOID TAKING CREDIT FOR THE IDEAS OF OTHERS? | VS S N D VD |
| 71. CONCENTRATE ON MEETING DEADLINES? | VS S N D VD |
| 72. DO NOT DOWNPLAY THE IMPORTANCE OF OUR WORK? | VS S N D VD |
| 73. MAINTAIN TIGHT CONTROLS WHEN THEY ARE NEEDED? | VS S N D VD |
| 74. AVOID DESTRUCTIVE COMMENTS ABOUT PEOPLE AT WORK? | VS S N D VD |
| 75. AVOID UNNECESSARY COMPLICATIONS? | VS S N D VD |

CONSIDER THIS MANAGER'S EFFECTIVENESS
IN THE FOLLOWING ACTIVITIES.
HOW SATISFIED ARE YOU
WITH THE WAY THIS MANAGER...

| | VERY SATISFIED | SATISFIED | NEITHER SATISFIED NOR DISSATISFIED | DISSATISFIED | VERY DISSATISFIED |
|---|---|---|---|---|---|
| 1. MAKES SURE THE RULES ARE CLEARLY UNDERSTOOD? | VS | S | N | D | VD |
| 2. KNOWS WHO HER/HIS CUSTOMERS ARE? | VS | S | N | D | VD |
| 3. KNOWS AND SUPPORTS THE MISSION OF THE OVERALL ORGANIZATION? | VS | S | N | D | VD |
| 4. STANDS UP FOR HIS/HER PERSONAL BELIEFS? | VS | S | N | D | VD |
| 5. CONSISTENTLY SHOW'S RESPECT AND CONCERN FOR PEOPLE AS INDIVIDUALS? | VS | S | N | D | VD |
| 6. GIVE'S APPROPRIATE ORIENTATION TO PEOPLE IN NEW ASSIGNMENTS? | VS | S | N | D | VD |
| 7. CONSISTENTLY TREATS THE USERS OF OUR PRODUCTS/SERVICES AS A TOP PRIORITY? | VS | S | N | D | VD |
| 8. DESCRIBE'S HIGHER LEVEL MANAGERS IN A POSITIVE WAY? | VS | S | N | D | VD |
| 9. SHOW'S A HIGH DEGREE OF PERSONAL INTEGRITY IN DEALING WITH OTHERS? | VS | S | N | D | VD |
| 10. COLLABORATE'S APPROPRIATELY IN SETTING OBJECTIVES? | VS | S | N | D | VD |
| 11. EFFECTIVELY ANALYZES PERFORMANCE? | VS | S | N | D | VD |

| | |
|---|---|
| 12. KEEPS THE WORK SIMPLE ENOUGH TO BE UNDERSTOOD AND IMPLEMENTED? | VS S N D VD |
| 13. UNDERSTANDS THE BASIC VALUES OF THE ORGANIZATION? | VS S N D VD |
| 14. ENCOURAGES AND ACCEPTS CONSTRUCTIVE CRITICISM? | VS S N D VD |
| 15. DELEGATE'S WHEN HE/SHE SHOULD? | VS S N D VD |
| 16. ENCOURAGES SUGGESTIONS FOR IMPROVING PRODUCTIVITY? | VS S N D VD |
| 17. COMMUNICATES A POSITIVE SENSE OF URGENCY ABOUT GETTING THE JOB DONE? | VS S N D VD |
| 18. ENCOURAGES EFFORTS TO SIMPLIFY PROCEDURES? | VS S N D VD |
| 19. IS DEDICATED TO MEETING THE NEEDS OF PEOPLE WHO USE OUR SERVICES/PRODUCTS? | VS S N D VD |
| 20. DISCOURAGES DESTRUCTIVE COMMENTS ABOUT THE ORGANIZATION? | VS S N D VD |
| 21. TAKES RESPONSIBILITY AND OWNERSHIP FOR HIS/HER DECISIONS? | VS S N D VD |
| 22. GIVES POSITIVE RECOGNITION FOR ACHIEVEMENT WITHOUT DISCOMFORT TO EITHER PARTY? | VS S N D VD |
| 23. TAKES THE TIME TO ANSWER QUESTIONS AND EXPLAIN DECISIONS? | VS S N D VD |
| 24. TIES INDIVIDUAL OBJECTIVES TO LARGER ORGANIZATIONAL GOALS? | VS S N D VD |
| 25. CLEARLY COMMUNICATES THE IMPORTANCE OF PEOPLE WHO USE OUR PRODUCTS/SERVICES? | VS S N D VD |

FIG 6b

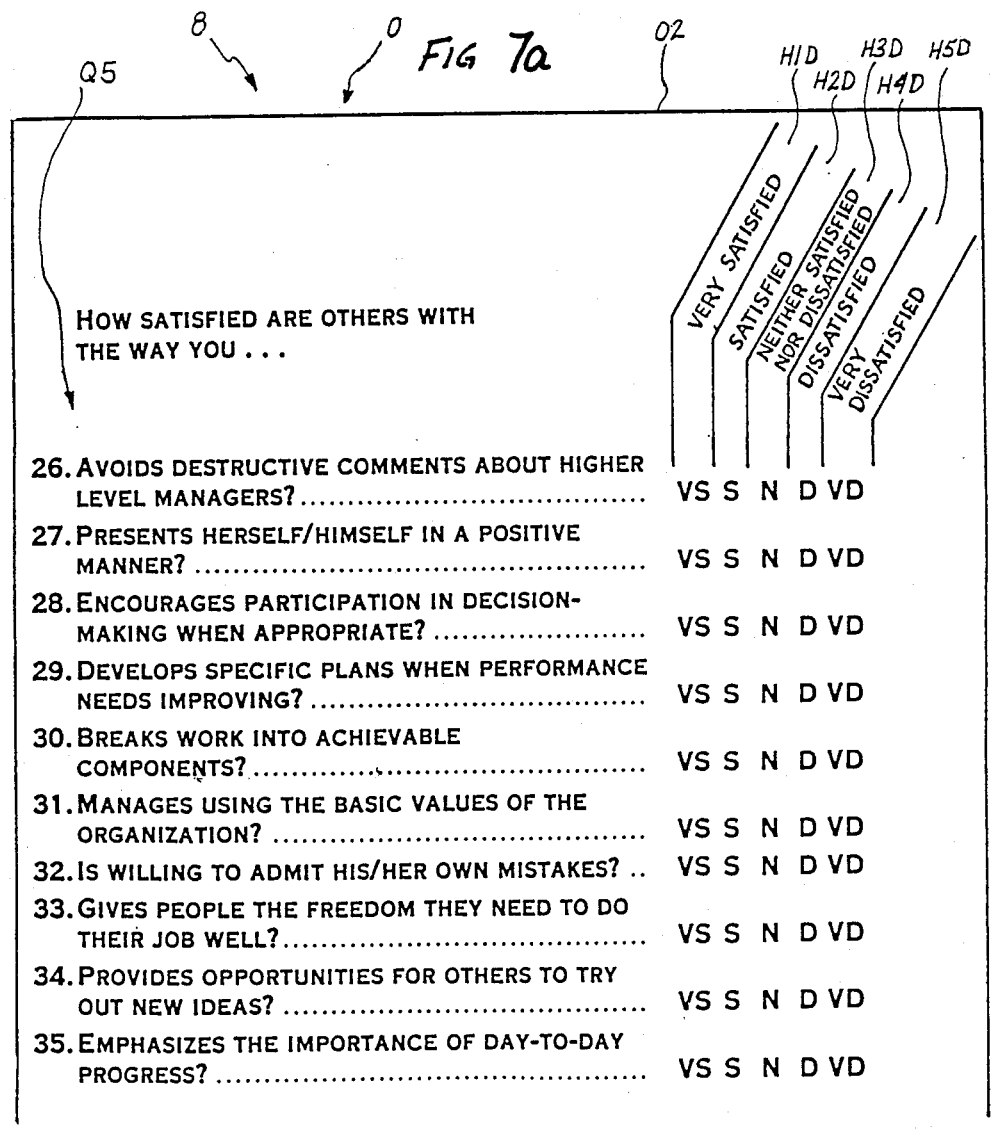

| | |
|---|---|
| 36. IS COMMITTED TO EXCELLENCE IN TASK ACHIEVEMENT? | VS S N D VD |
| 37. GIVES SPECIFIC DIRECTIONS WHEN NEEDED? | VS S N D VD |
| 38. ENCOURAGES AND LISTENS TO INPUT FROM THE PEOPLE WHO USE OUR SERVICES/PRODUCTS? | VS S N D VD |
| 39. IS HONEST AND POSITIVE IN DESCRIBING ORGANIZATIONAL BENEFITS? | VS S N D VD |
| 40. TAKES REASONABLE RISKS IN TRYING OUT HIS/HER NEW IDEAS? | VS S N D VD |
| 41. ADEQUATELY REWARDS AND REINFORCES TOP PERFORMANCE? | VS S N D VD |
| 42. BUILDS PEOPLE'S ABILITY AND UNDERSTANDING? | VS S N D VD |
| 43. CONCENTRATES ON ACHIEVING WHAT IS MOST IMPORTANT? | VS S N D VD |
| 44. DOES NOT ALLOW DESTRUCTIVE COMMENTS ABOUT THE PEOPLE WHO USE OUR PRODUCTS/SERVICES? | VS S N D VD |
| 45. PERSONALLY SUPPORTS HIGHER LEVEL MANAGEMENT DECISIONS? | VS S N D VD |
| 46. DEMONSTRATES CONFIDENCE IN HERSELF/HIMSELF AS A MANAGER? | VS S N D VD |
| 47. BUILDS AND MAINTAINS PEOPLE'S CONFIDENCE? | VS S N D VD |
| 48. STRIVES TO IMPROVE PEOPLE'S PERFORMANCE FROM ACCEPTABLE TO EXCELLENT? | VS S N D VD |
| 49. ENCOURAGES OTHERS TO OPERATE USING THE BASIC VALUES OF THE ORGANIZATION? | VS S N D VD |
| 50. ACTS ON CONSTRUCTIVE ADVICE IN A TIMELY MANNER? | VS S N D VD |

How satisfied are you with the way this manager...

| | VERY SATISFIED | SATISFIED | NEITHER SATISFIED NOR DISSATISFIED | DISSATISFIED | VERY DISSATISFIED |
|---|---|---|---|---|---|
| 51. Encourages others to take as much responsibility as they can handle? | VS | S | N | D | VD |
| 52. Acts on ideas and suggestions from others in a timely manner? | VS | S | N | D | VD |
| 53. Encourages taking action to get things done? | VS | S | N | D | VD |
| 54. Makes the task meaningful and relevant? | VS | S | N | D | VD |
| 55. Supervises closely when necessary? | VS | S | N | D | VD |
| 56. Acts to solve customer's (users') problems in a timely manner? | VS | S | N | D | VD |
| 57. Inspires pride in the organization? | VS | S | N | D | VD |
| 58. Is more concerned with achieving excellence than "playing it safe"? | VS | S | N | D | VD |
| 59. Makes people feel like "winners"? | VS | S | N | D | VD |
| 60. Provides coaching and guidance when it is needed? | VS | S | N | D | VD |

| | |
|---|---|
| 61. PLACES GREATER EMPHASIS ON ACCOMPLISHING THE MISSION THAN FOLLOWING PROCEDURES?.... | VS S N D VD |
| 62. IS MORE COMMITTED TO CUSTOMERS' (USERS') LONG-TERM SATISFACTION THAN OUR SHORT-TERM GAIN? .................................... | VS S N D VD |
| 63. DOES NOT "PASS THE BUCK" OR BLAME HIGHER LEVEL MANAGEMENT? ............................... | VS S N D VD |
| 64. AVOIDS DESTRUCTIVE SELF-CRITICISM? ........... | VS S N D VD |
| 65. PROVIDES CONTINUING SUPPORT WHEN IT IS NEEDED? ............................................... | VS S N D VD |
| 66. GIVES DEVELOPMENTAL PERFORMANCE FEEDBACK IN A TIMELY MANNER? ................. | VS S N D VD |
| 67. TAKES CORRECTIVE ACTION WHEN BASIC ORGANIZATIONAL VALUES ARE COMPROMISED?... | VS S N D VD |
| 68. DOES NOT DISCOURAGE PEOPLE FROM GIVING HIM/HER CONSTRUCTIVE CRITICISM? .............. | VS S N D VD |
| 69. TAKES APPROPRIATE RISKS IN LETTING OTHERS MAKE DECISIONS? ..................................... | VS S N D VD |
| 70. AVOIDS TAKING CREDIT FOR THE IDEAS OF OTHERS? ............................................... | VS S N D VD |
| 71. CONCENTRATES ON MEETING DEADLINES? ........ | VS S N D VD |
| 72. DOES NOT DOWNPLAY THE IMPORTANCE OF OUR WORK? ................................................ | VS S N D VD |
| 73. MAINTAINS TIGHT CONTROLS WHEN THEY ARE NEEDED? ............................................... | VS S N D VD |
| 74. AVOIDS DESTRUCTIVE COMMENTS ABOUT PEOPLE AT WORK? ............................................ | VS S N D VD |
| 75. AVOIDS UNNECESSARY COMPLICATIONS? .......... | VS S N D VD |

FIG 8b

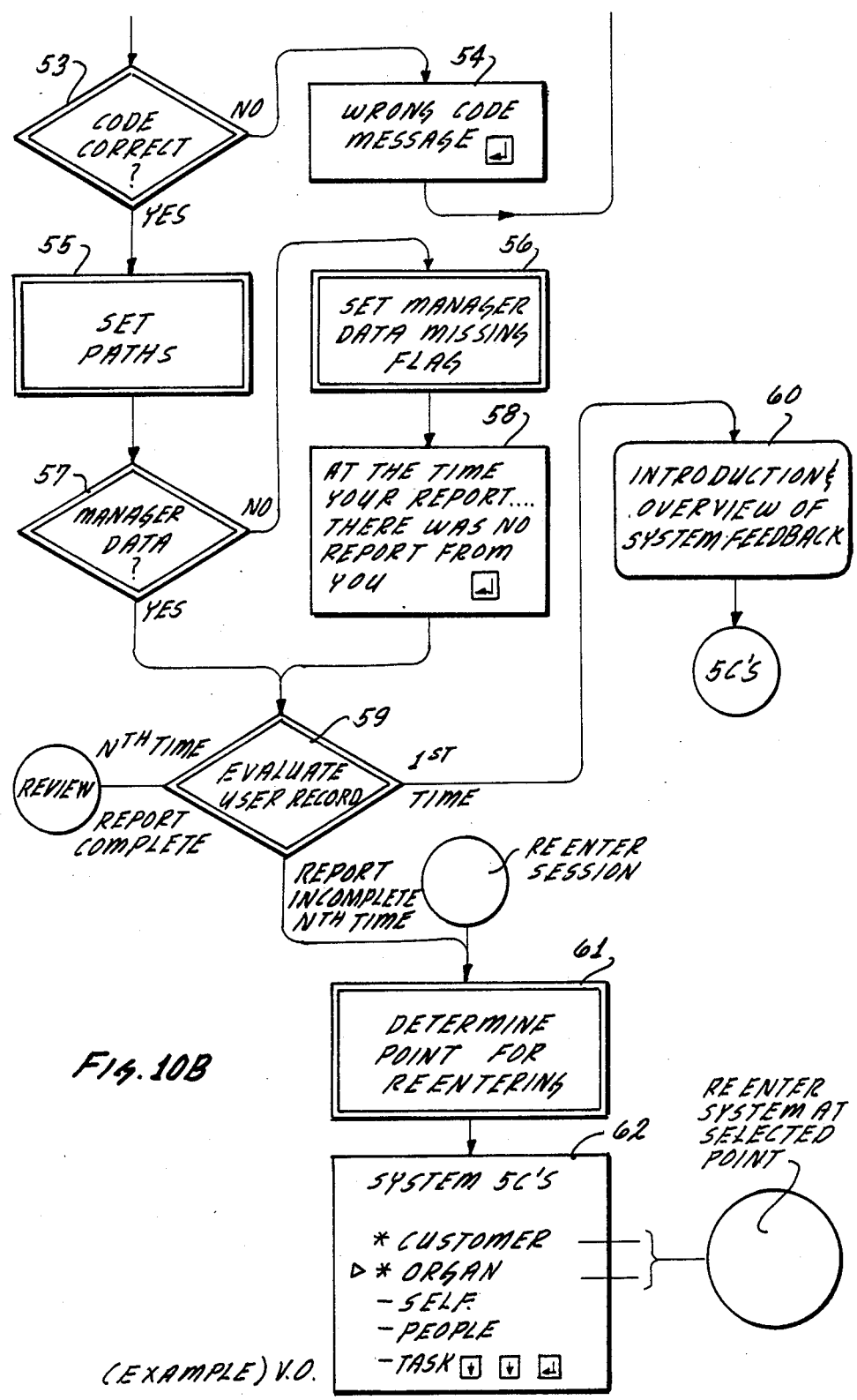

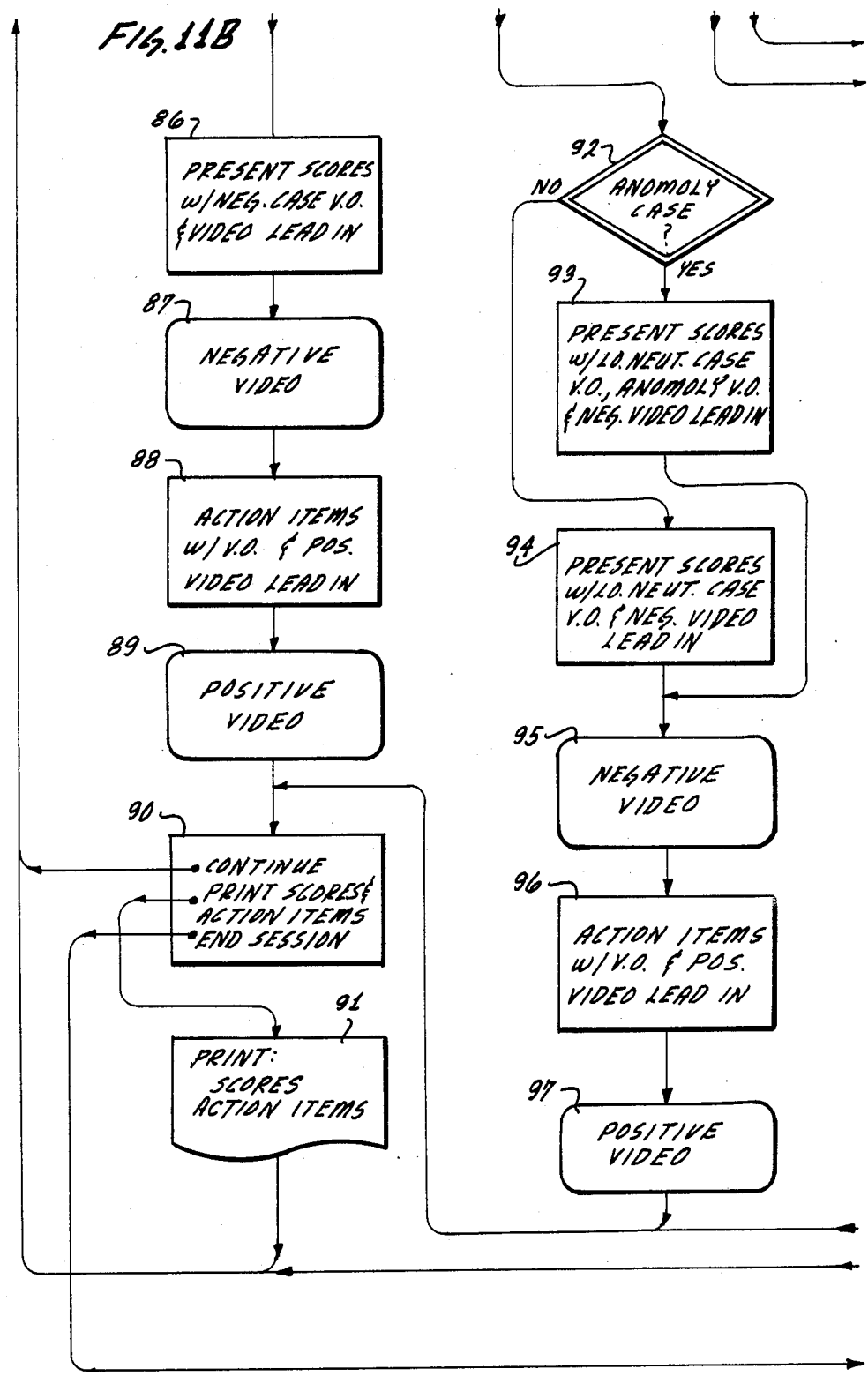

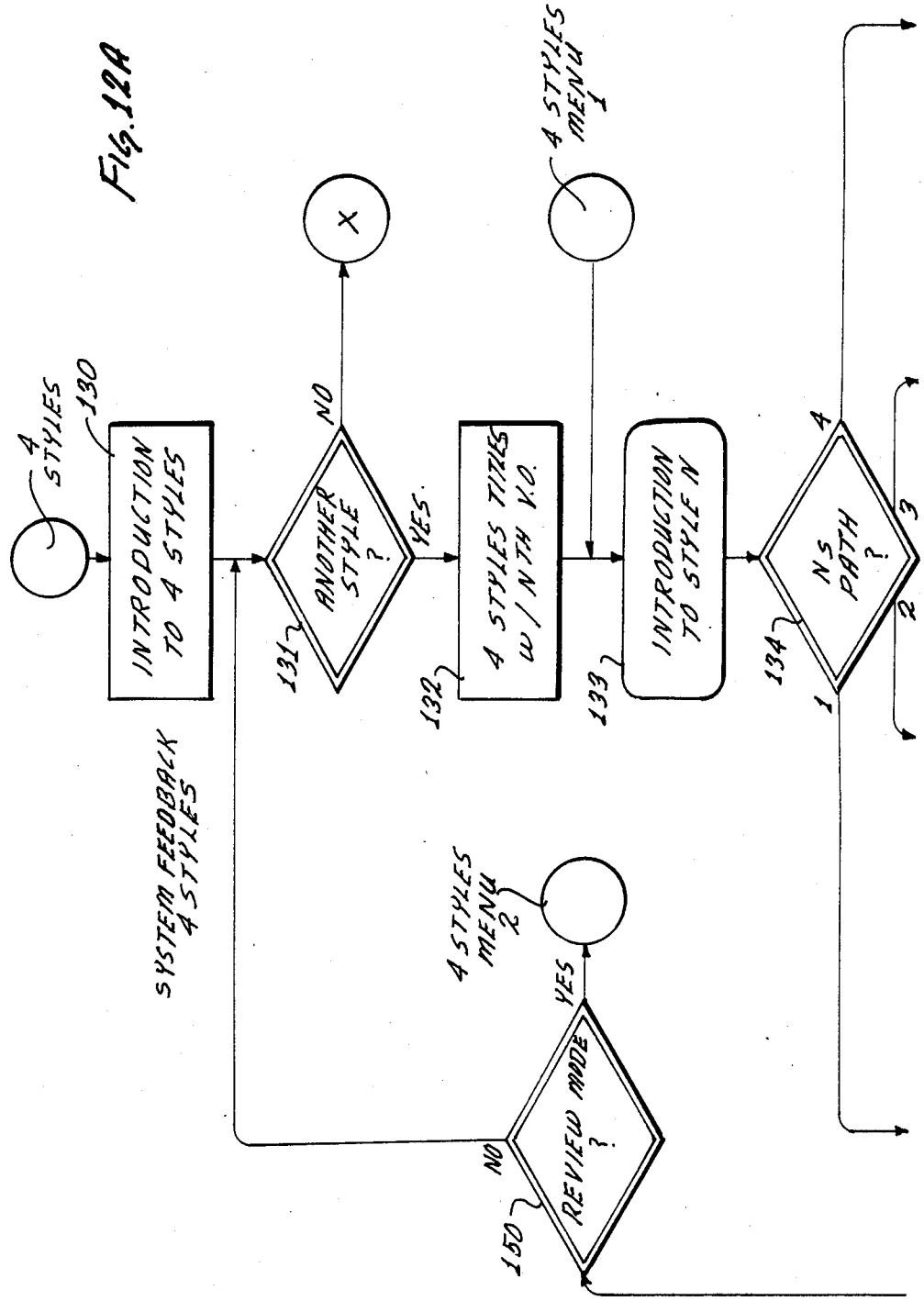

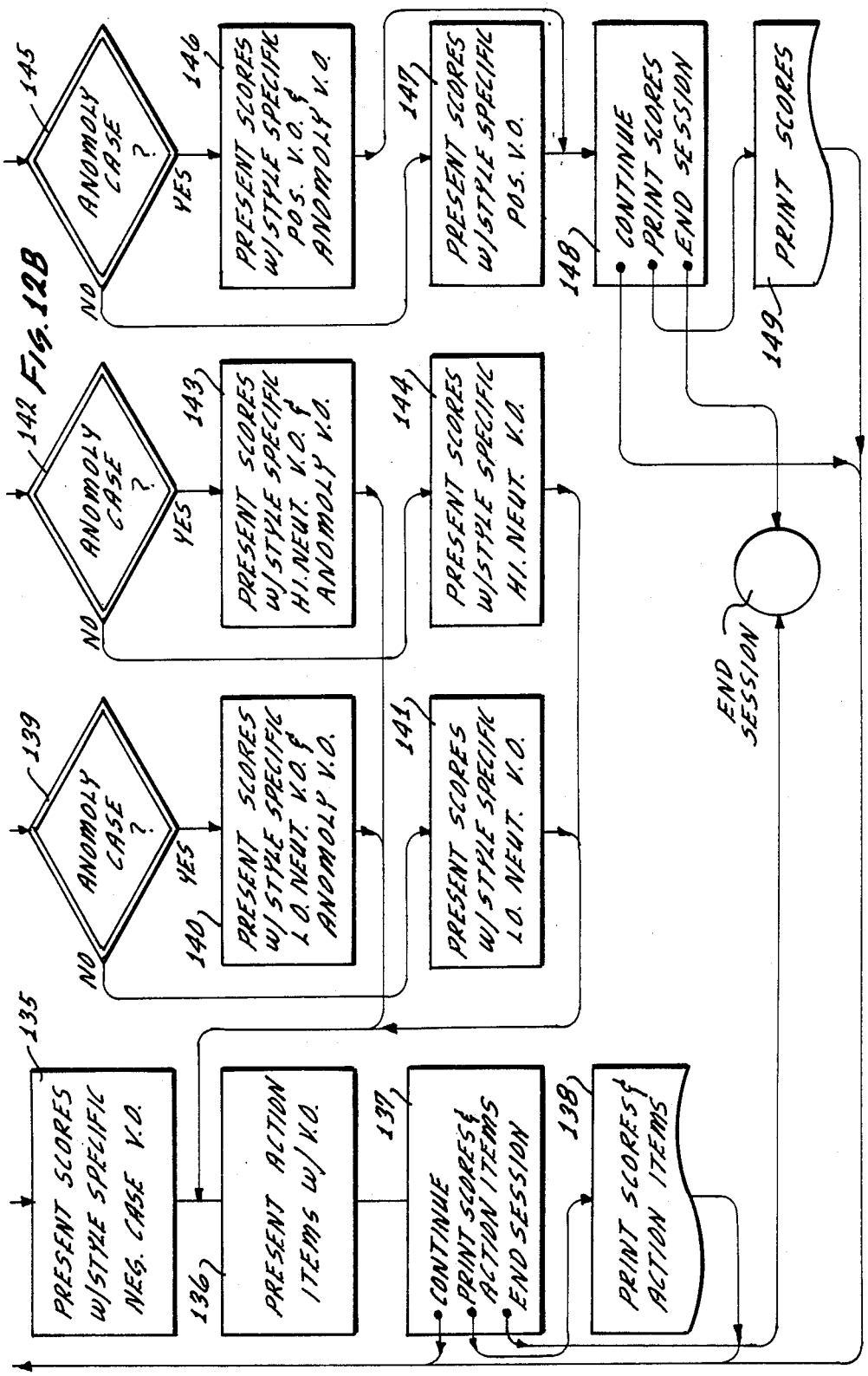

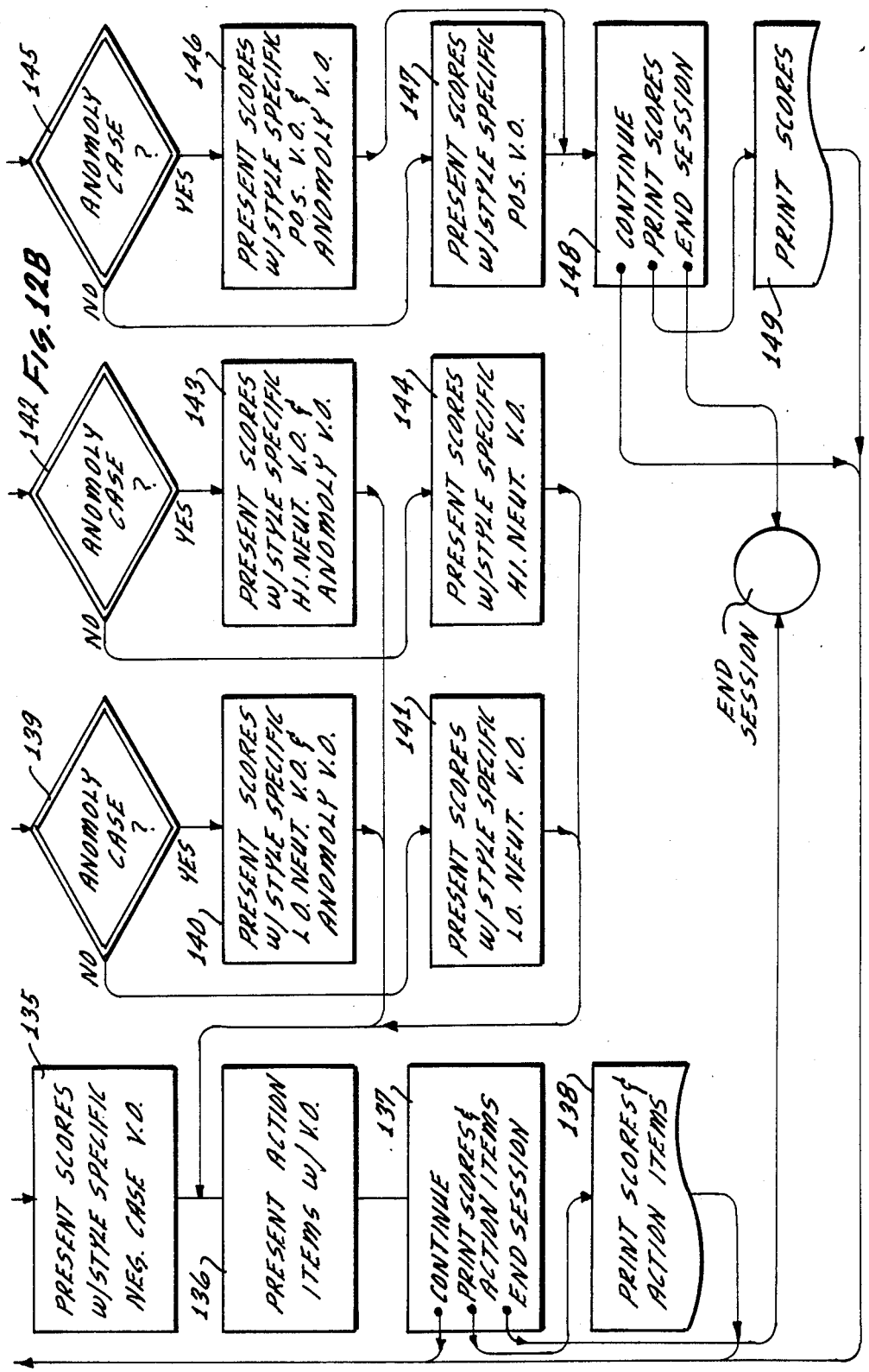

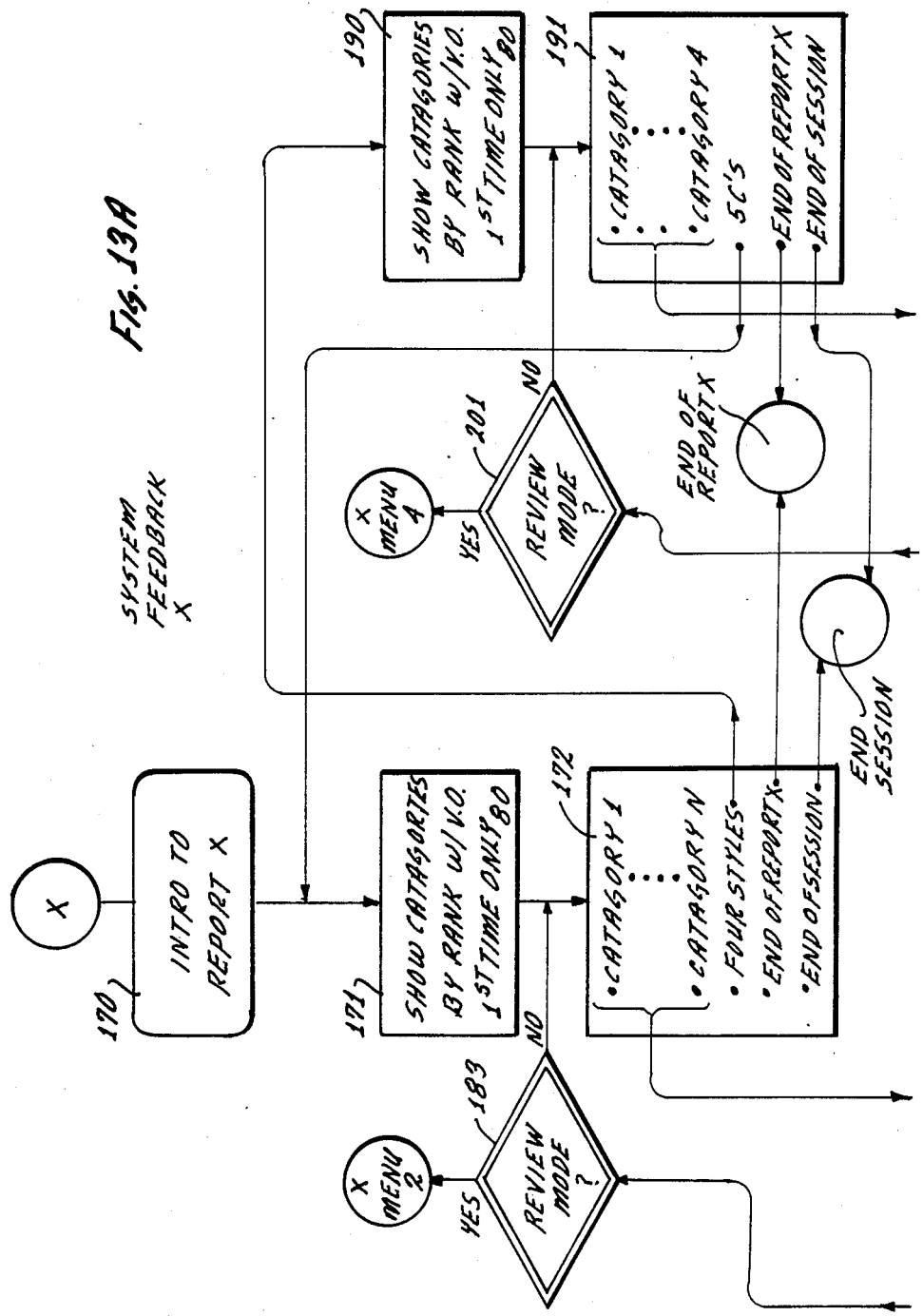

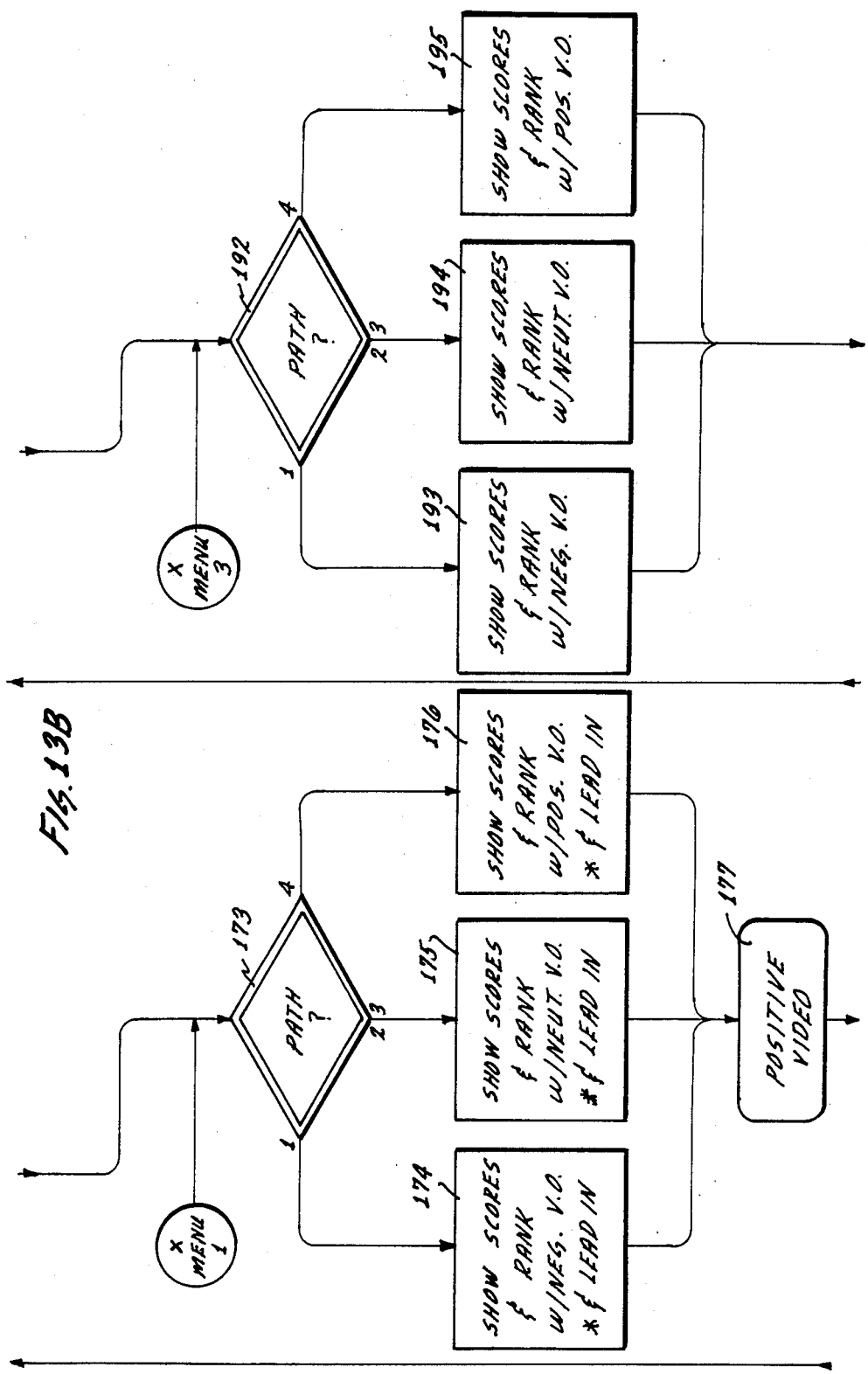

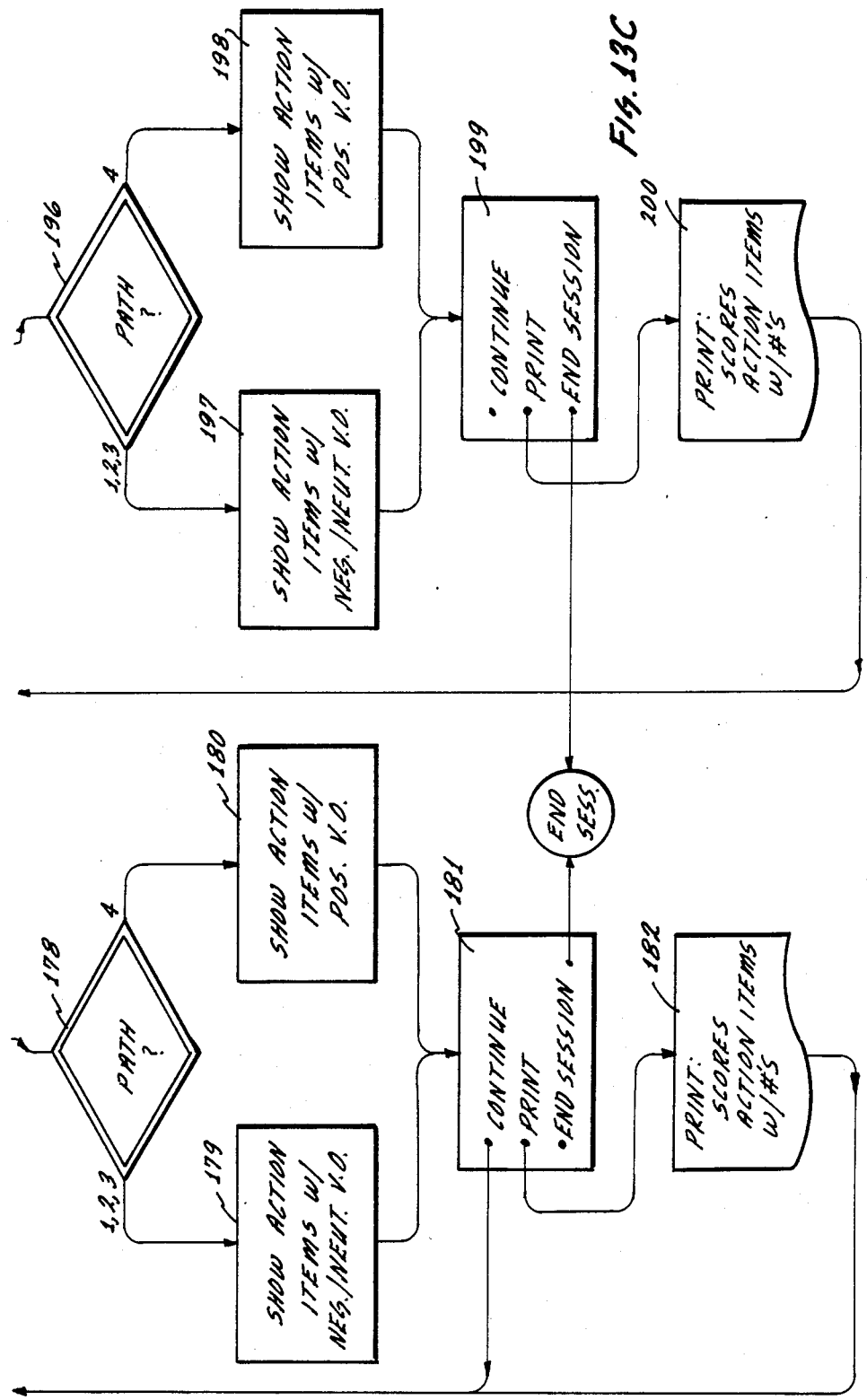

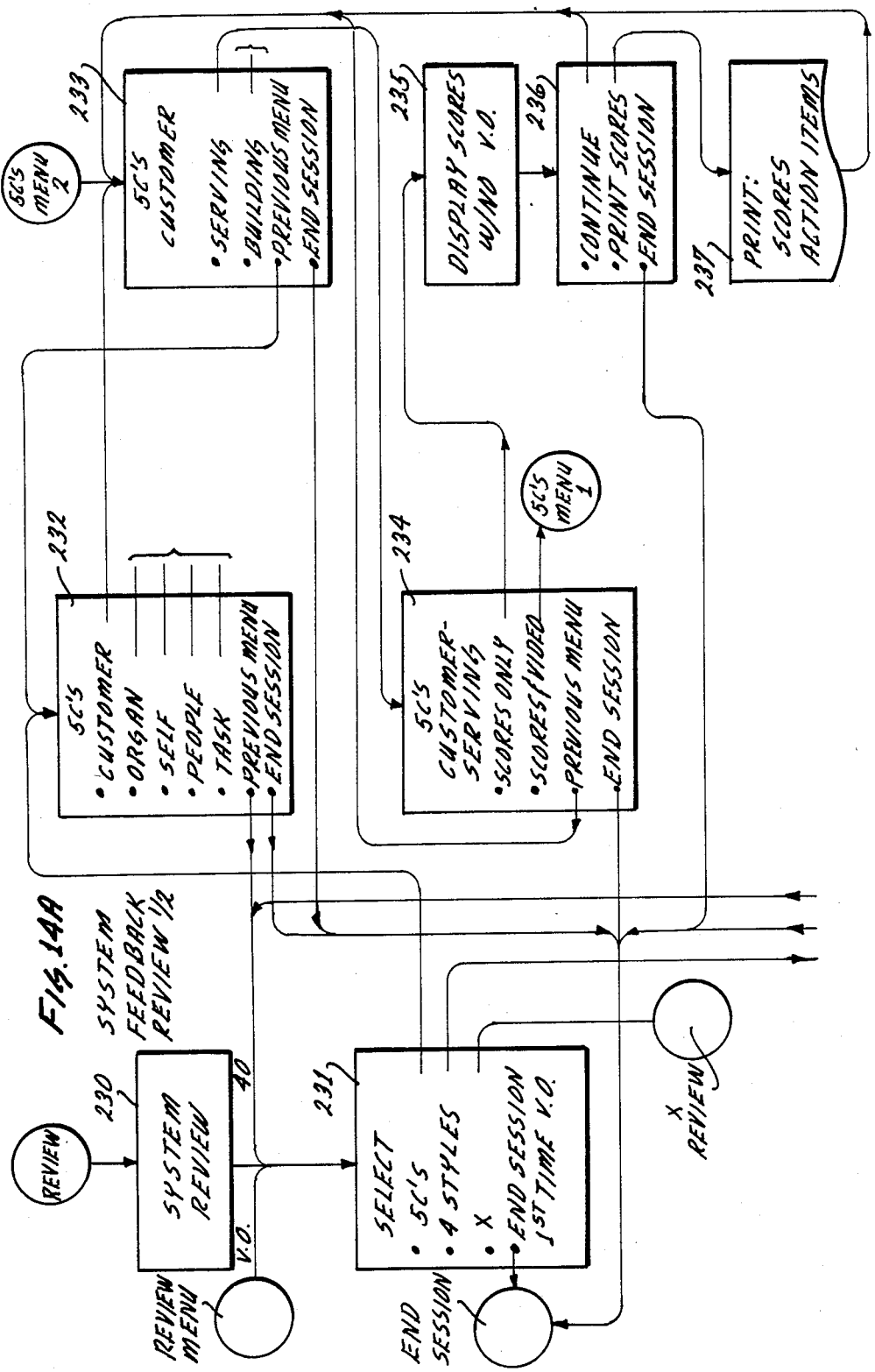

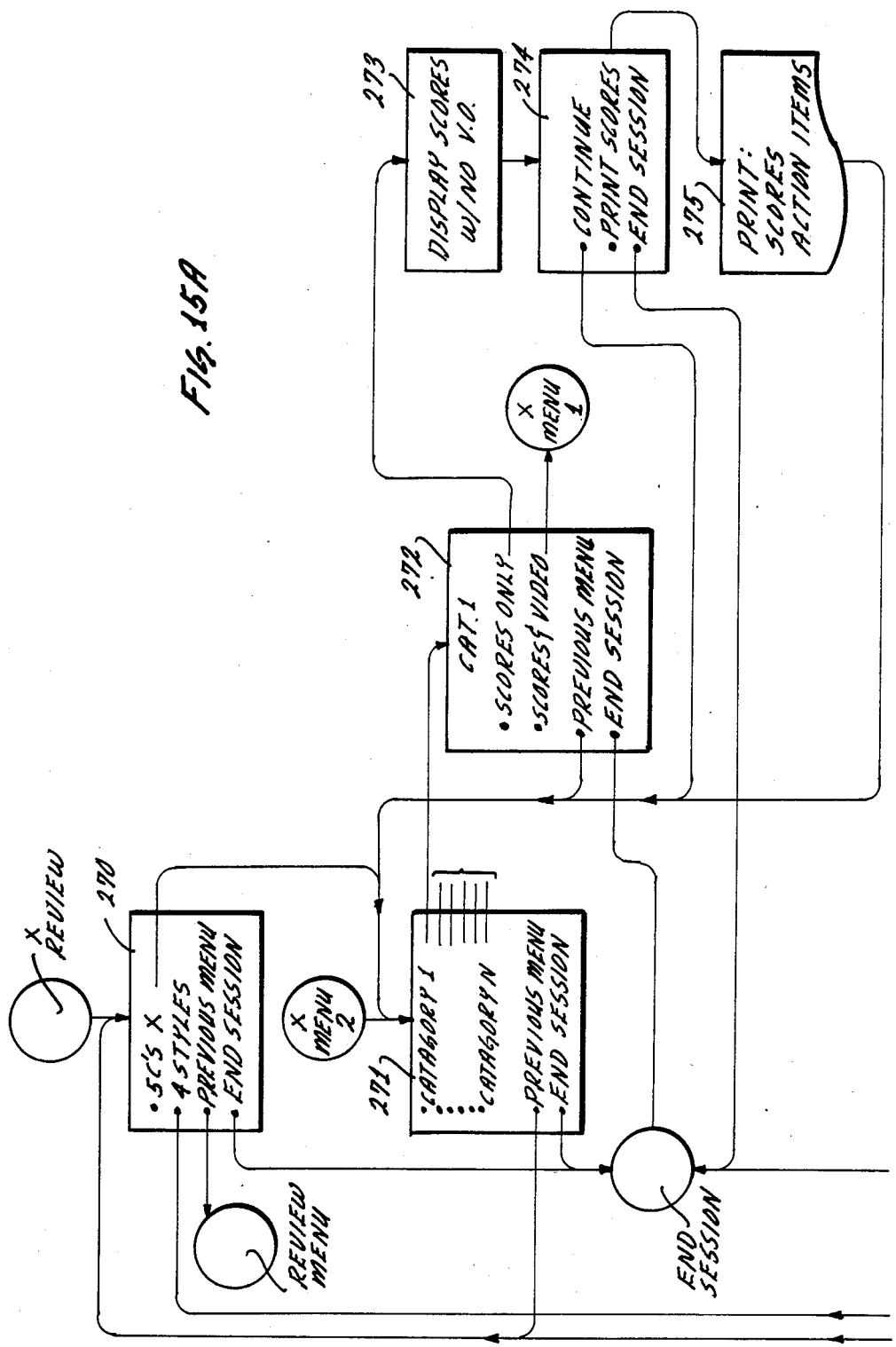

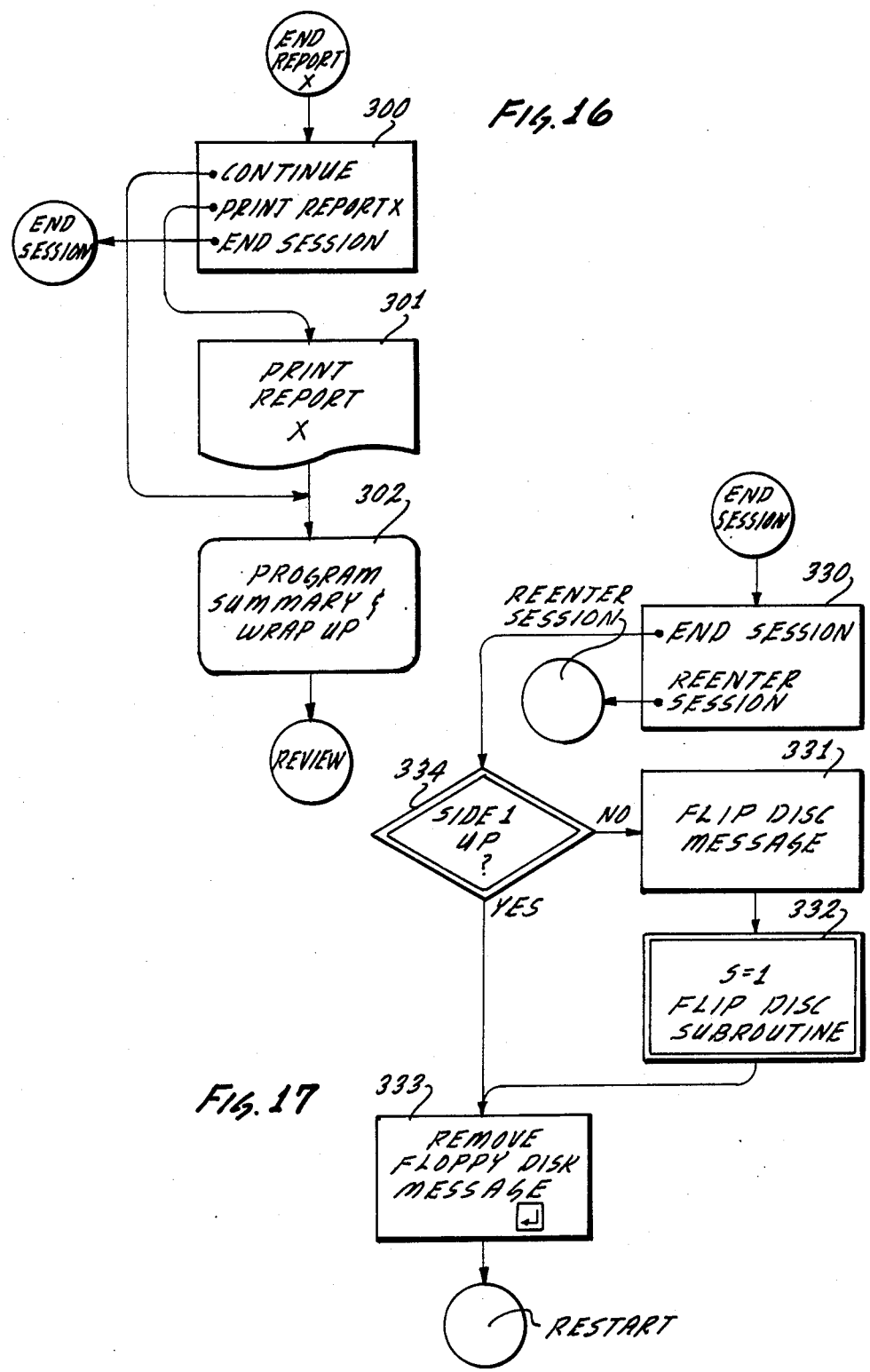

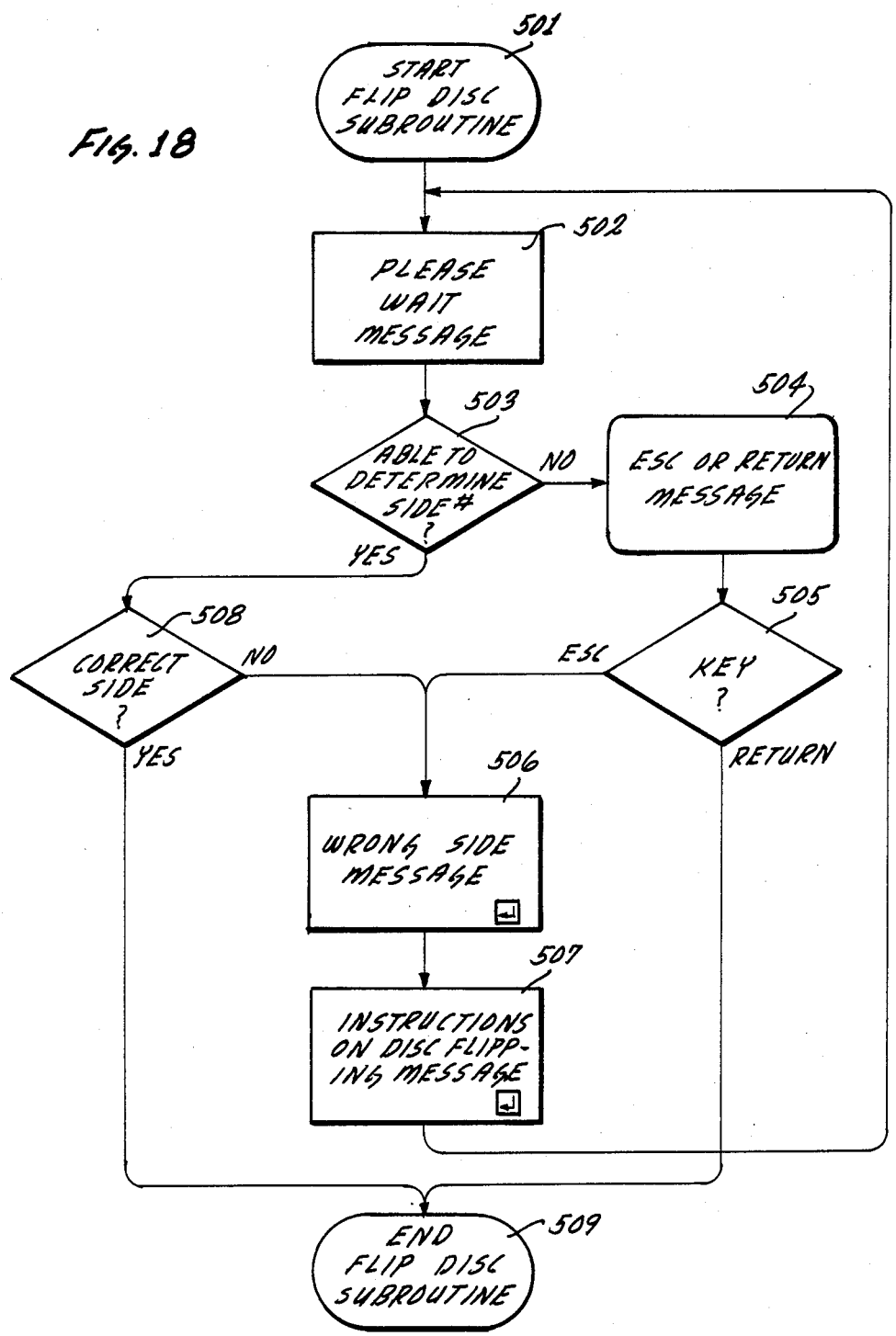

PERFORMANCE APPRAISAL AND TRAINING SYSTEM AND METHOD OF UTILIZING SAME

DESCRIPTION

1. Technical Field

This invention relates generally to business management systems, and particularly to a system for facilitating performance appraisal and training through individual use of a computer system.

2. Background Art

Recognized as essential to business success, competent management is in constant demand, and many management training aids have been devised to develop the manager's skills. By training the individual manager and potential managers, the company benefits from greater manager expertise, while helping the manager grow professionally.

Performance appraisal is employed as an integral part of many training programs, and it is known to employ a questionnaire or other type of survey device for eliciting responses from both the manager and selected co-workers as part of the appraisal process. The survey typically includes a series of questions designed to obtain responses suitable for developing data respecting the strengths and weaknesses of the manager, in relation to management duties, and how the performance of the manager is perceived by others.

Frequently, the response data is compiled for review by the manager as a feedback device, upon which to base corrective action, or otherwise inspire improvement. The data is reviewed, and a supervisor discusses the survey results with the manager to aid and encourage improvement.

While these techniques are commonly employed in existing performance appraisal programs, and have been satisfactory for some applications, they suffer from certain drawbacks. For example, the review by a co-worker, in the form of a face-to-face appraisal conference, often produces many interpersonal problems and inaccuracies. These often frustrate the appraisal or training process, causing anxiety to those involved and otherwise producing generally counterproductive results. The appraisal process often seems more trouble than it is worth, and the resulting negative attitude further compounds the problem.

Consider, for example, a typical appraisal conference held to review the performance of a manager. As the scheduled time arrives and the conference is conducted, both the manager being appraised and the manager's supervisor experience a number of common emotions that can critically affect the appraisal process.

From the manager's point of view, the conference may represent a threat to his present or future position. If the supervisor is not favorably impressed, the manager's chances for promotion may be affected adversely, or, in some cases, the manager may be without a job. From the supervisor's point of view, the conference is often equally threatening. The skill with which the conference is conducted and the improvement the manager manifests, gauge the ability of the supervisor and the future advancement by the manager.

Thus, both parties to the conference are involved intensely in the process, and, are cast in the roles of manager and supervisor. They sit down face-to-face to conduct a review of one by the other, and this is the setting where some common problems arise.

One problem concerns the defensive attitude of the manager when confronted with deficiencies in performance. As much as it is desirable that the parties rise above this emotion and objectively review performance, a defensive, closed-minded attitude nevertheless prevails to reduce the effectiveness of the appraisal process. Personal, ego-related issues arise that require the utmost skill and understanding to handle effectively. Without such skill and understanding, effective communication and satisfactory performance appraisal can not be accomplished. Consequently, it is desirable to have a technique for overcoming this problem, some manner of confronting a manager with criticism and suggested improvements, while maintaining an open, positive learning attitude on the part of the manager during the whole process.

Another problem that arises concerns the verbal explanations given the manager. These often have insufficient impact on the manager to cause change in attitudes or behavior. The supervisor is frequently not a skilled educator in the first place, and the manager whose performance is being appraised, is often more concerned with getting the whole ordeal over with, so that the significance of what is being said, does not really make a lasting impression on the mind of the manager. Consequently, it is desirable to have an appraisal system that would alleviate this concern as well.

Yet another problem relates to retention of information by the manager concerning his or her performance. Though the manager may understand what is being said and how performance can be improved, this may be forgotten soon after the conference is over, so that no real progress is made. It would be highly desirable to have some technique for reminding the manager of the suggestions for improved performance, so that such suggestions can be reviewed as desired in the future.

Still another problem that arises, relates to the manner in which the explanations and advice are given a manager being reviewed. These extemporaneous explanations are often wordy and inconsistent. These may vary from manager to manager, and provide a poor basis for meaningful improvement. Consequently, it is desirable to have an appraisal system that would promote concise and consistent advice, independent of when given or by which supervisor.

DISCLOSURE OF INVENTION

Therefore, the principal object of the present invention is to provide a new and improved performance appraisal and training system, which enables convenient review and training, while providing a meaningful appraisal in a concise and consistent manner, of the strengths and weaknesses of a person as perceived by others as well as ample feedback of one's progress in improving.

It is another object of the present invention to provide such an appraisal system, which creates and reinforces a positive learning attitude, substantially free of the negative influences frequently accompanied by face-to-face co-worker review.

Briefly, the above and further objects of the present invention are realized by providing a system that employs survey devices for procuring performance appraisal data indicative of the performance of a user to be trained, and a data delivery medium for providing computer-readable compiled performance data signals indicative of compiled performance data of the user.

Feedback presentation memory components are provided for storing prerecorded feedback display signals indicative of a group of motion picture vignettes illustrative of various situations resulting from various types of performance. Computer components respond to the performance data signals and to the display signals for displaying to the user both the compiled performance data and selected corresponding ones of the stored motion picture vignettes to illustrate situations resulting from the past performance of the user.

Thus, problems associated with co-worker review and training are avoided by providing feedback in a self-training environment, and a user is able to proceed in private at a convenient time, with feedback that is tailored at the user's needs.

In the first place, the problem of defensive manager reaction is largely eliminated. The face-to-face conference that formed the core of many prior appraisal systems is completely replaced with a personalized video presentation. The supervisor is not even permitted access to the system, nor any compiled data. It is presented on the basis of performance appraisal data compiled on a confidential basis by persons other than co-workers, persons employed outside of the company that have no contact with the manager and thus constitute no threat to anyone within the company.

In addition, the computer-controlled feedback presentation is designed to have a much more meaningful impact on the manager. The presentation is based upon the performance appraisal data procured about the past performance of the manager and the performance trait typifying the behavior of the manager. The presentation includes pre-recorded motion picture vignettes of situations resulting from both positive and negative performance characteristics of the manager. They are tailored to convey convincingly the desired message and thereby cause a positive change in attitudes and behavior of the manager. A picture is worth a thousand words.

Not only does this improve the retention by the manager of the information, but unlike the personal appraisal conferences, it can be reviewed as often as desired. Thus, a manager is encouraged to review his or her own progress at periodic intervals, in a positive learning exercise, without the fear and anxiety associated with the conferences employed in many existing appraisal systems. With the data provided in computer-readable form on a data diskette or other suitable delivery system, and computer programming instructions provided on a program diskette, it is an easy matter for the manager to review his or her personalized feedback presentation as often as desired, as well as to repeat the survey and the feedback presentation to monitor performance growth.

Furthermore, due to the computer system involved, the system is concise and consistent. It provides feedback and training to a manager using highly regarded audio-visual training techniques and well thought out and directed motion picture vignettes that eliminate the imprecision and inconsistencies typifying face-to-face confrontation.

A method of utilizing the system includes the steps of procuring performance appraisal data indicative of a performance trait that is characteristic of a user to be trained, followed by communicating a computer-readable compilation of the performance appraisal data to the user. The feedback presentation component then enables the user to review a motion picture vignette that is descriptive of the consequences flowing from the performance trait indicated by the performance appraisal data. A computer utilizes the computer-readable compilation to retrieve the appropriate vignette.

Thus, this up-to-date self-training system is suitable for a variety of performance appraisal situations. It is well adapted to use in both private and business environments, and it takes advantage of modern large scale use of personal computers.

BRIEF DESCRIPTION OF DRAWINGS

The above-mentioned and other objects and features of this invention and the manner of attaining them will become apparent, and the invention itself will be best understood, by reference to the following description of an embodiment of the invention taken in conjunction with the accompanying drawings, wherein:

FIG. 2 is a schematic diagram of a cable for use in the system of FIG. 1;

FIGS. 3–8 are face views of survey devices in the form of questionnaires forming a part of the system of FIG. 1;

FIGS. 9–19 are flowchart diagrams illustrating computer program software for both the computer and the videodisc player of the system of FIG. 1.

DETAILED DESCRIPTION

Figure 1:
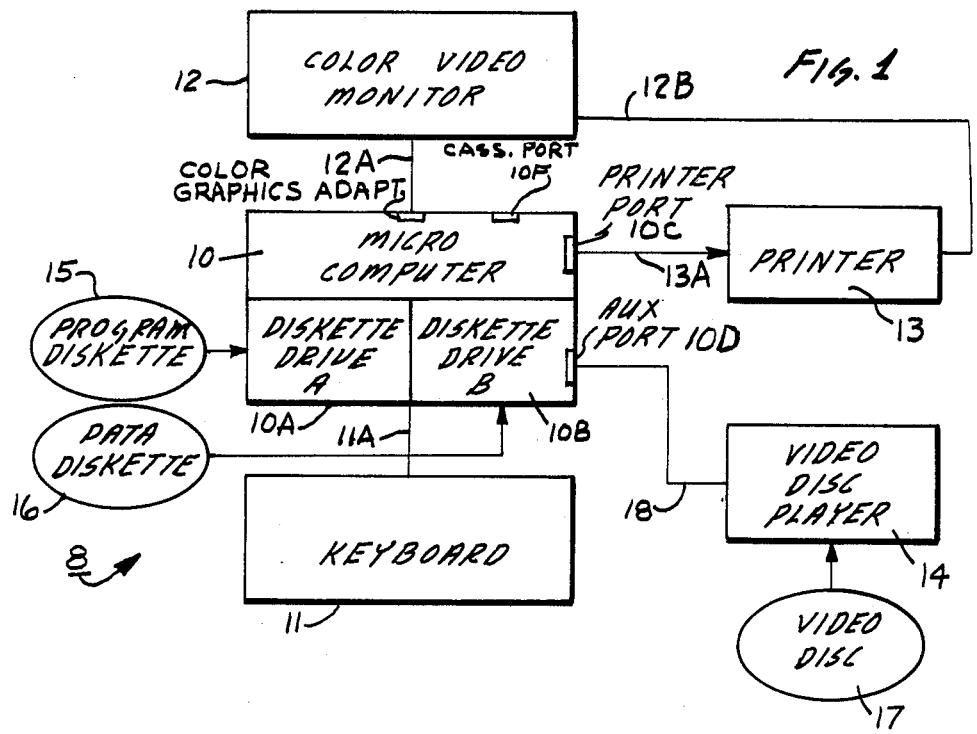
FIG. 1 is a symbolic block diagram of a performance appraisal and training system constructed according to the present invention.

The detailed description is organized according to the following outline:
A. SYSTEM GENERAL DESCRIPTION
B. SYSTEM GENERAL OPERATION
C. HARDWARE DETAILED DESCRIPTION
D. SURVEY INSTRUMENTS
E. COMPUTER SOFTWARE
F. VIDEODISC SOFTWARE
G. ALTERNATIVE SYSTEM

A. SYSTEM GENERAL DESCRIPTION

Referring now to the drawings, and more particularly to FIGS. 1–8 thereof, there is shown a performance appraisal and training system 8, which is constructed according to the present invention.

The system 8 includes a personal computer generally indicated at 9, such as the model sold by IBM Corporation of New York under the trade name "IBM PC". It will become apparent to those skilled in the art that other types and kinds of computers may also be employed in accordance with the present invention. The personal computer 9 includes a microcomputer processor unit 10, having a disk drive A designated 10A, and disk drive B designated 10B, as well as a printer port 10C and an auxiliary port 10D. A keyboard 11, is connected via cable 11A in a conventional manner to the processor unit 10, to enable a user to input data and commands thereto. Color video monitor 12 is connected via a monitor cable 12A to the processor unit 10, and it provides a video display. The monitor 12 is manufactured by Sony Corporation of Japan, and sold under model No. PVM 1271Q.

Printer 13 is a conventional printer connected via a cable 13A to printer port 10C of unit 10 to provide hard copy output of the reports generated by the system 8, as hereinafter described in greater detail. A laser videodisc player 14 is preferably a videodisc player manufactured under the trade name LDP-1000A by Sony Corporation of Japan, and has its communications port onnected to the auxiliary port 10D of the unit 10 via cable 18 to enable computer control of the videodisc player, for enabling access to a group of motion picture vignettes stored as video information on a videodisc 17.

The cable 12A conveys the computer RGB signals to the monitor 12, as well as a mode switching signal to change the mode between computer graphics and videodisc player graphics. Cables 12B (1 video, 1 audio), convey both audio and NTSC video signals from the player 14 to the monitor 12. The video signals are switchable, but the audio is constant to enable voice-overs during computer generated graphics.

Figure 19:
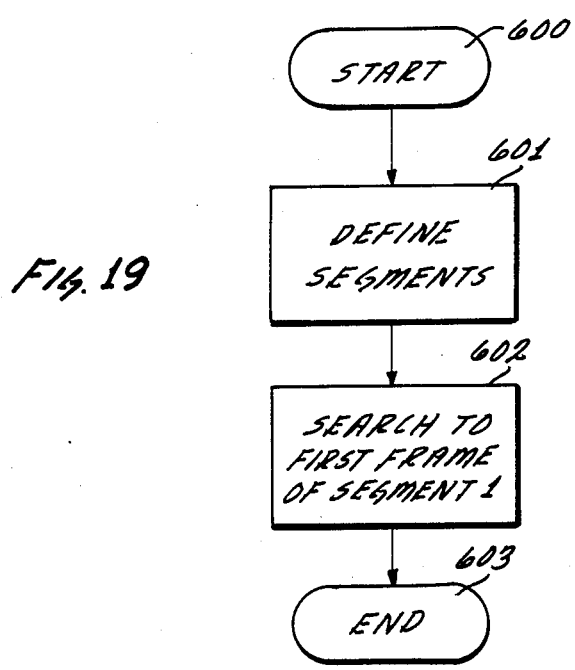

Computer program software is also stored on the laser videodisc 17, to help control the information supplied to the personal computer 9. The videodisc program software is shown in FIG. 19, as hereinafter described in greater detail.

Program diskette 15 contains a computer program, as shown in FIGS. 9-18, for controlling the unit 10 to cause the display of data on the monitor 12 and to cause the retrieval and display of appropriate vignettes corresponding to the compiled data for a given user manager. The diskette 15 is a conventional floppy diskette suitable for use with the personal computer, and it is inserted in drive 10A, according to procedures commonly employed with personal computers, to provide programming instructions enabling individual use of the system of this invention on the personal computer 9, as hereinafter described in greater detail.

Data diskette 16 is also a conventional floppy diskette that is compatible with the personal computer, and it serves as a data communication medium for providing an individual user with a computer-readable compilation of data. The diskette 16 is inserted in drive 10B to enable computer access to the compiled data stored on it, according to well known operating procedures associated with personal computers.

A videodisc 17 cooperates with the videodisc player 14, and serves as a video recording of a series of motion picture vignettes that are descriptive of consequences accompanying a variety of performance traits, both positive and negative. It provides the individual user with a library of prerecorded video vignettes or segments, corresponding to a variety of possible data compilations. The videodisc is compatible with the videodisc player, and it is inserted into videodisc player 14 to enable computer access to the information contained thereon. Videodisc player 14 is coupled to an RS232 auxiliary port 10D with a cable 18 to enable use of the videodisc player with the unit 10.

Thus, the personal computer 9, with a keyboard, video display, and printer, is used in conjunction with a videodisc player and suitable programming as feedback presentation means for enabling user review of one or more of the vignettes related to the performance of the user.

As hereinafter described in greater detail, as shown in FIGS. 3-8, the system 8 includes a series of survey instruments or devices in the form of printed questionaires. They are employed for procuring a set of performance appraisal data for use, in compiled form, in the feedback presentation, together with the program diskette 15, data diskette 16 and videodisc 17, so that the user is able to review a combination of both the compiled data and a corresponding selection of video vignettes, using the system 8 of the present invention.

B. SYSTEM GENERAL OPERATION

Generally, the operation of system 8 commences with the procurement of performance appraisal data using the "SELF" and "OTHER" performance appraisal survey questionnaires. The manager or other user to be trained completes the SELF questionnaire shown in FIGS. 3-5, and has a group of three or more subordinates fill out the OTHER questionnaire shown in FIGS. 6-8.

The completed questionnaires are then sent to the owner of system 8 outside the company of the manager. Such company should employ having no direct interest in or contact with those preparing the questionnaires in order to avoid any fear of reprisal or other defensive emotion by those completing the questionnarie.

The compilation personnel prepare the performance appraisal data compilation and communicate it back to the manager in computer-readable form on data diskette 16. When the manager desired to review the performance data compilation, a time is chosen to privately use the feedback presentation system 9 provided for this purpose. With videodisc 17 inserted in videodisc player 14, program diskette 15 in diskette drive A, and the manager's data diskette 16 in diskette drive B, the manager starts up the system. Then, under system control, an audio-visual presentation is provided based upon the manager's performance appraisal data.

The presentation begins with introductory comments by a narrator to set the mood and accustom the manager to the computer-controlled self-training that is about to take place. The performance data compilation is displayed and explained so that the manager can review the "OTHER" responses as they compare to the "SELF" responses given by the manager, and a voice over explains the scores and how they inter-relate.

The presentation is keyed to average scores in a given category. The interpretation of disparity between "self" and "other" data is up to the individual. It is provided but not automatically interpreted.

Under control of the program stored on program diskette 15, the processor unit proceeds to cause various vignettes to be displayed that relate to various areas of concern revealed by the performance appraisal data. Each vignette employs one or more actors or actresses as players portraying situations that might commonly occur within the company. These situations demonstrate consequences that are likely to accompany certain conduct on the part of the manager, and they employ the conventional point of view camera technique whereby the players address the camera to achieve the illusion that the manager is part of the situation being portrayed.

Depending on scores, a negative vignette may be shown first to demonstrate the harmful consequences that are likely to accompany the performance of concern. Thus, the players may portray a problematic situation that has arisen as a result of certain hypothetical manager conduct, with suggestions then appearing that discuss how the conduct might be changed and the problem averted. The processor then causes the videodisc player to generate a positive vignette using the same players to enact a positive situation that is likely to result from the suggested change in conduct, and this is reinforced by further narrator discussion to complete analysis of one area of concern.

Next, the score on another area of concern is displayed, and the process repeated, to demonstrate first, a negative, and then a positive vignette showing results that may accompany other manager conduct.

Finally, the processor causes the display of a summary of the information provided, and the user is given the option to repeat selected areas of the presentation and/or use the printer to print out various scores and suggestions given. When the manager has finished using the system, data diskette 16 is removed and taken with the manager, while the balance of the system remains available for use by others being trained. Anyone desiring to use the system simply brings along their personal data diskette for review in private at a time most convenient and as often as desired.

C. HARDWARE DETAILED DESCRIPTION

Considering now the system 8 in greater detail, the personal computer 9 is used by the manager user to review the compiled data by displaying it on the monitor 12, using known personal computer operating techniques. In this regard, the system 8 is initialized and software is loaded and run from an AUTOEXEC.BAT file on the program diskette 15, as provided to the manager and as used in the A diskette drive 10A. This file automatically uses the MODE.COM command to shift the display to the right to center it (since Sony monitors mask the left-hand edge of the IBM video display), and to initialize the RS-232 part 10D asynchronously, by loading the appropriate COM file. The COM file automatically begins execution of the program once loaded, and a session is terminated by re-booting the system with a different system disk in drive A, all according to well-known procedures associated with the operation of conventional personal computers.

The data diskette 16 storing a complilation of data procured using the survey instruments, is then inserted in the B diskette drive 10B on the personal computer, which is then operated privately by the user to review both the complilation and a corresponding selection of prerecorded video vignettes.

The personal computer 9 interacts with the user; and controls the actions of the video player 14, and the monitor 12. The user's input is performed using a limited number of keys (not shown) on the computer keyboard 11. Control of the videodisc player 14 is asserted via the RS-232 asychronous communications adapter (not shown) for the port 10D of the personal computer 9.

Figure 20:
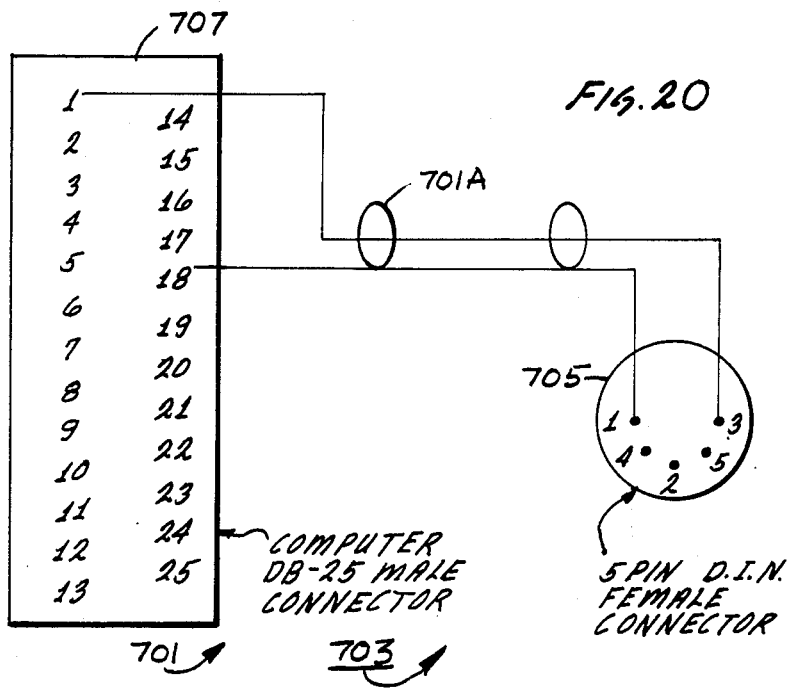
FIG. 20 is a schematic diagram of another cable suitable for use in another performance appraisal and training system constructed in accordance with the present invention.

Computer text and icons are generated using a color display adapter (10A). Selection of videodisc video or computer is asserted through the cassette port 10F, of the unit 10, or as shown in FIG. 20 of the drawings, and as fully described in part G. hereof, through a second print port LPT:2 (not shown) of a hard disk personal computer (not shown), manufactured by IBM Corporation and sold under the trade name PC-XT, if such a computer is used in place of the computer 9.

The videodisc player 14 plays back video and audio information from the videodisc 17 under the direction of the computer 9. The cable 18, conveys the control signals for the player 14. In this regard, the special computer/monitor cable 12A conveys video signals from the graphic display adapter (10E) in the personal computer 9 to the monitor 12. This custom cable includes an additional connector allowing it to convey switching information from the computer for selecting between videodisc video and computer video.

The video and audio cables 12B carry the videodisc video as selected by the personal computer 9. It also plays the audio from the videodisc player. Audio channel selection is done by the computer 9 in commands to the videodisc player 14.

Considering now the cable 18 in greater detail, as shown in FIG. 2, the adapter cable 18 includes seven wires designated A and nine-pin DB-9 male connector 18A, which is adapted to be connected electrically to a color graphics adapter (not shown) of the computer 9. A pair of wires B are connected to a computer cable 5 pin D.I.N. male connector 18B for connection to the cassette port 10F of the unit 10. The port 10D is switchable for controlling the display mode for the monitor 12.

A DB-25 female connector 18C is adapted to be connected to the video monitor 12.

D. SURVEY INSTRUMENTS

Figure 4A:
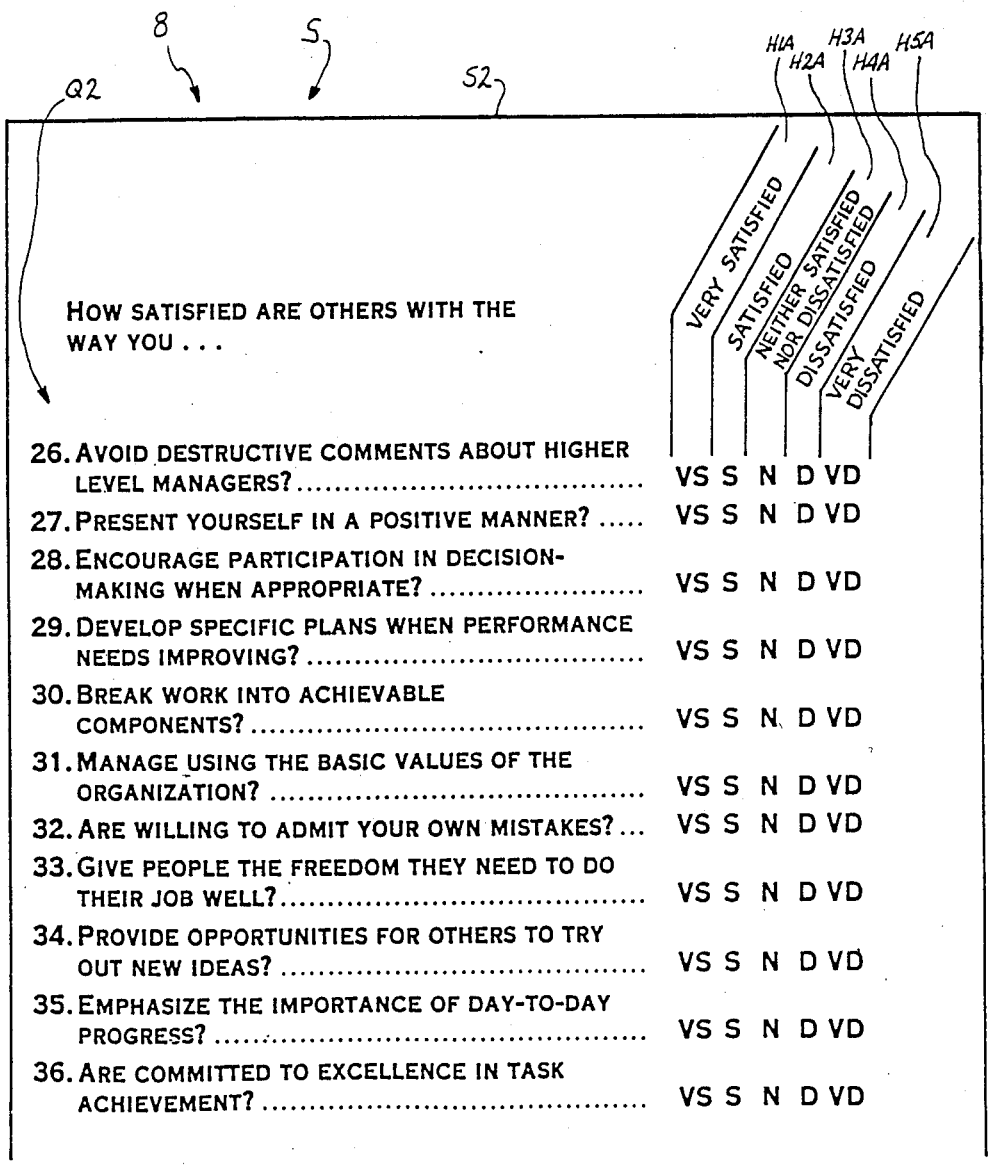

Considering now the survey instruments as shown in FIGS. 3-8, the "SELF" survey instrument S includes three pages S1, S2 and S3, as shown on respective FIGS. 3, 4 and 5. Similarly, "OTHER" survey instruments 0 for the subordinates of the manager, and includes three pages 01, 02, and 03, as shown on the respective FIGS. 6, 7 and 8.

The survey instruments are part of the system 8. The manager who is to receive the data, fills out a SELF survey instruments S (FIGS. 3-5). The manager's peers, subordinates, or other co-workers, each fill out OTHER survey instruments 0, (FIGS. 5-8). The number of OTHER instruments 0, filled out is determined by the manager, but there should be a minimum of three such surveys filled out to constitute a sample adequate to provide the desired appraisal. While three OTHER survey instruments are preferred, a fewer number may also be employed for some applications.

The self and other survey forms are collected and the answers entered into a conventional general purpose computer system (not shown) that manages the data and produces a compilation thereof, according to means known in the art. An operator may, for example, read the response data from the survey instruments and key it into the computer. It will become apparent to those skilled in the art that the keying process could be replaced with optical scanning of the instruments, or the transfer of response data from other computer systems (not shown). Once all the required surveys have been entered for a given manager, that manager's compiled data can be generated.

The compilation of information may be printed on paper or may be stored as an encrypted data file on the data diskette 16. Diskette compiled information is stored on the data diskette 16 for an individual manager's private use. In this regard, the manager's personal and private diskette can be mailed to the manager, or otherwise transmitted to him or her.

The compiled data includes categories of questions, answered on the surveys. Each question is scored by how many people responded, what the number of responses were for each of the five possible answers, and what the manager anticipated the response from his or her peers, subordinates, or other co-workers, would be. Questions are compiled into groups called "categories." For each category, a set of scores summarizing the pertinent questions is given along with an average score for the category. There are a total of nineteen categories used by the computer software shown in FIGS. 9-19. Of the nineteen categories, fifteen are used in a group called the "five commitments" report, and the remaining four are used in a separate report called the "four leadership styles" report.

A summary report may be shown on the monitor 12 and may list the highest rated categories, as well as the lowest rated categories for the manager to review. The following table is an example of such a report, FOLLOWED BY an appropriate list of three ways to encourage innovative ideas.

In addition, a report may be generated that may list the highest rated questions, as well as the lowest rated questions for the manager to review.

| | Summary - The Five Commitments | |
|---|---|---|
| 0 1 | Accept Constructive Criticism | (S) |
| 0 2 | Building the Organization | (O) |
| 0 3 | Showing Concern/Recognition | (P) |
| 0 4 | Building Task Importance | (T) |
| 0 5 | Supporting Higher Management | (O) |
| 0 7 | Operating by the Basic Values | (O) |
| 0 8 | Building Customer Importance | (C) |
| 0 9 | Demonstrating Autonomy | (S) |
| 0 9 | Being Action Oriented | (T) |
| 011 | Encouraging Innovative Ideas | (P) |
| 012 | Keeping it Simple | (T) |
| 013 | Building Yourself as a Manager | (S) |
| 014 | Serving the Customer | (C) |
| 015 | Keeping the Right Focus | (T) |
| | Summary - The Four Styles | |
| * 1 | S4 - Delegating (Loose Control) | |
| 0 2 | S3 - Supporting, Participating | |
| 0 3 | S2 - Guiding, Coaching | |
| 0 4 | S1 - Directing (Tight Control) | |

C = Customer,
O = Organization,
S = Self,
P = People,
T = Task

The categories in the summaries for the five commitments and four styles, are listed with the categories having the lowest average scores at the top and highest average scores at the bottom. The categories at the top of these lists are the ones that deserve the most attention. Categories that have the same rank number indicate a tie in the average. For example, refer to rank 9 of the five styles.

An asterisk indicates an item reviewed while looking at the summary. Refer to S4 of the four styles. All of the remaining commitments and styles each has a zero to the left of it, to indicate that these remaining items are not currently being reviewed.

The following are listings of the overall summaries of both the high satisfaction items, and the low satisfaction items.

Overall Summary

High Satisfaction Items:
2. Knows who her/his customers are (4.4)
19. Dedicated to meeting the needs of people who use our services/products (4.2)
13. Understands the basic values of the organization (4.2)
3. Knows and supports the mission of the overall organization (4.2)
1. Makes sure the rules are clearly understood (4.2)
73. Maintains tight controls when they are needed (4.0)
56. Acts to solve customers' (users') problems in a timely manner (4.0)
54. Makes the task meaningful and relevant (4.0)
53. Encourages taking action to get things done (4.0)
46. Demonstrates confident in herself/himself as a manager (4.0)
45. Personally supports higher level management decisions (4.0)
43. Concentrates on achieving what is most important (4.0)
39. Is honest and positive in describing organizational benefits (4.0)
38. Encourages & listens to input from those using our survices/products (4.0)
27. Presents herself/himself in a positive manner (4.0)
20. Discourages destructive comments about the organization (4.0)
12. Keeps the work simple enough to be understood and implemented (4.0)
8. Describes higher level managers in a positive way (4.0)
7. Treats the users of our products/services as a top priority (4.0)
4. Stands up for his/her personal beliefs (4.0)

Low Satisfaction Items:
70. Avoids taking credit for the ideas of others (2.2)
41. Adequately rewards and reinforces top performance (2.6)
59. Makes people feel like "winners" (2.6)
22. Gives positive recognition for achievement without discomfort (2.8)
40. Takes reasonable risks in trying out his/her new ideas (2.8)
58. Is more concerned with achieving excellence than "playing it safe" (2.8)
61. More emphasis on accomplishing the mission than following procedures (2.8)
11. Effectively analyzes performance (3.0)
14. Encourages and accepts constructive criticism (3.0)
21. Takes responsibility and ownership for his/her decisions (3.0)
32. Is willing to admit his/her own mistakes (3.0)
47. Builds and maintains people's confidence (3.0)
62. More committed to users' long-term satisfaction than short-term gain (3.0)
63. Does not "pass the buck" or blame higher level management (3.0)
69. Takes appropriate risks in letting others make decisions (3.0)
75. Avoids unnecessary complications (3.0)

In the above tables, the number at the left indicates the number of the question appearing on the survey instrument. The number in parentheses indicates the average score for that question.

The following is a listing of representative suggestions displayed by the monitor 12:

Encouraging Innovative Ideas
1. Avoid early judgement on a new idea by getting several inputs.
2. Give adequate recognition for an individual with a new idea.
3. Communicate the basic mission of the organization of staff and ask for ideas on how to work towards the mission.

Besides the information identified in the above tables, the system 8 provides additional information for the diskette version of the report. As each diskette report is generated, a code number or password is assigned to the manager for his or her use by the system as a security code, to permit access to the information encoded on the data diskette 16. The code number is entered during the generation of the data diskette and creates a brief transmittal letter (not shown), or other suitable communication, for the manager to be trained. This confidential letter conveys the code number to the manager who will review the compiled information privately.

The end result is computer-readable compiled information on the floppy diskette 16 with an encrypted file, and a letter (not shown) transmitting the selected individual's code number for each compilation generated. This further insures confidentiality.

The manager, or other selected individual, uses the diskette 16 and the letter in conjunction with the system 8 to review the compilation. The system 8 is controlled by the control software on the program diskette 16 to manage the presentation of the compilation.

Considering the survey instruments in greater detail, as shown in FIGS. 3-8, there is shown both a three page set of self-appraisal questions for use in eliciting self-appraisal responses from a selected individual, and a three page set of related questions for eliciting a series of other responses from each member of a group of other individuals. Each of the six pages is designated generally by reference numeral 8 to indicate it to be a part of the illustrated system 8. They serve as a survey arrangement for enabling procurement of performance appraisal data indicative of one of the variety of performance traits, of which the vignettes are descriptive; that is, characteristic of a user to be trained.

The page S1 is composed of paper material, and bears on its face, indicia generally indicated at Q1 and configured in the shape of twenty-five questions (1-25) illustrated in FIG. 3. The page S2 bears on its face indicia Q2 configured in the shape of twenty-five additional questions (26-50), as illustrated in FIG. 4, and the page S3 includes indicia Q3 configured as twenty-five further questions (51-75) illustrated in FIG. 5. Pages S1-3 constitute one three page survey instrument.

As shown in FIG. 3, column heading indicia designated H-1 through H-5 head five columns that enable the user to choose between five different responses for each of the questions of FIG. 3. These questions may be presented to the user to be trained in the form of a survey instrument for the user to read and respond to in private, and the user simply circles the desired response. Similar heading indicia are employed for the remaining five survey pages.

It serves as means for enabling the user to record in private a series of self-appraisal responses to a series of performance appraisal questions.

FIGS. 6-8 illustrate another three page set containing related question indicia Q4 through Q6. The indicia are configured to present twenty-five questions on each page, combined constitute a second survey instrument for enabling each member of a group of other individuals to record in private, a series of other responses to a related series of questions. Thus, the page 01 of the instrument 0, includes indicia configured in the shape of twenty-five questions (1-25) as illustrated in FIG. 6 that is designated generally by the letter "O" for Other, and particularly as 01, along with the page 02 of twenty-five questions (26-50) illustrated in FIG. 7, and the page 03 of twenty-five questions (51-75) illustrated in FIG. 8, form a three page survey instrument suitable for this purpose. As with the first survey instrument, five columns are included, and each question is followed by five alternate responses which may be chosen by the user completing the survey instrument.

An inventory is taken using these instruments. The inventory comprises a series of questions about the management techniques and methods used. These questions appear in two forms: one survey instrument, form OTHER, asks other people to record their perceptions about the user's management practices, and the second survey instrument, Form SELF, which asks the user to record perceptions about how others will respond.

The user is asked to contact each subordinate or peer personally and ask for their support by having them complete Form OTHER. The user explains that their data will be kept anonymous by being compiled into a confidential summary report with several other respondents.

The user helps each one to understand that their feedback is important, and encourages frank, candid responses to the questions. The user emphasizes that action on their part is important so that data can be processed in time to provide the summary report. They are asked to complete the questionnaire and mail it in the envelope (not shown) provided within three working days.

The user and the other people are all encouraged to take time to carefully complete the questionnaires, noting that responses will appear on the summary report with those of other people and that the user will benefit by knowing how other people respond and how closely the user's predictions parallel those of others.

All are advised that the summary report will be compiled by persons outside the company and reviewed only by the user to assist in the user improved performance.

All are advised that cooperation in providing the data is appreciated, that the feedback will be more valuable if all items are completed, and that in items dealing with the customer, the user is asked to focus on the internal customers (within the organization), and/or external customers if applicable.

Each item on the user questionnaire is preceded by the question "How satisfied are others with the way you . . . ." The response choices are: VS for Very Satisfied, S for Satisfied, N for Neither Satisfied nor Dissatisfied, D for Dissatisfied, and VD for Very Dissatisfied. The questionnaire are completed by circling a choice at the right of each item. For example, if the response choice is "Satisfied", for an item, S is circled at the right of the item.

Although some items may appear to be similar, no two items are exactly the same, and everyone is asked to treat each item separately.

In addition, the other people are asked to record written comments, to take a moment to help the user better understand those particular activities which make her/him an excellent manager and that this is also an opportunity to provide feedback on items or issues not directly addressed in the questionnaire. Assurance is given that this is an important part of the feedback, and the time spent is appreciated. Also, that the comments will be transmitted to the user in an anonymous form, so to assure anonymity, comments or references which would specifically identify the source should be avoided.

Using these two survey instruments for gathering a set of performance appraisal data that is indicative of the performance of a person, provides information upon which to appraise the performance of such person, by means of the system of this invention. The system enables self-review and training by a user in private, without the negative influences of co-worker review as found in the prior known systems. Furthermore, the system 8 employs contemporary teaching techniques and equipment to create and reinforce a positive learning attitude.

In order to accomplish the desired results, the system 8 employs in its compiled data and video vignettes, a suitable set of rationales. The set of rationales used in the illustrated questions in the survey instruments, is based upon the concept of five key commitments of a manager. The five key commitments are the commitment to customer, to organization, to self, to people, and to task.

The commitment to customer stresses that the excellent manager serves the customer, both internal and external. The manager knows who the customers are, is dedicated to meeting the needs of people who use the company's services or products, encourages and listens to input from people who use the company's services or products, and acts to solve customers' problems in a timely manner.

In addition, this commitment stresses that the excellent manager builds customer importance. The manager consistently treats the users of the company's products or services as a top priority, clearly communicates the importance of the people who use the products or services, does not allow destructive comments about these people, and is more committed to customers' long-term satisfaction than the company's short-term gain. The commitment to the organization and its management stresses that the excellent manager builds the organization. The manager knows and supports the mission of the overall organization, discourages destructive comments about the organization, is honest and positive in describing organizational benefits, and inspires pride in the organization.

In addition, this commitment stresses that the excellent manager supports higher management. The manager describes higher level managers in a positive way, avoids destructive comments about higher level managers, personally supports higher level management decisions, and does not "pass the buck" or blame higher level management.

Furthermore, this commitment stresses that the excellent manager operates by the basic values. The manager understands the basic value of the organization, manages using the basic values of the organization, encourages others to operate using the basic values of the organization, and takes corrective action when basic organization values are compromised.

The commitment to self as a manager stresses that the excellent manager demonstrates autonomy. The manager stands up for the manager's personal beliefs, takes responsibility and ownership for decisions, takes reasonable risks in trying out new ideas, and is more concerned with achieving excellence than "playing it safe."

In addition, this commitment stresses that the excellent manager builds self as a manager. The manager shows a high degree of personal integrity when dealing with others, presents the manager's own self in a positive manner, demonstrates confidence as a manager, and avoids destructive self-criticism.

Furthermore, this commitment stresses that the excellent manager accepts constructive criticism. The manager is willing to admit to mistakes, encourages and accepts constructive criticism, acts on constructive advice in a timely manner, and does not discourage people from giving constructive criticism. The fourth commitment, the commitment to people, individuals, and the work team, stresses that the excellent manager shows positive concern and recognition. The manager consistently shows respect and concern for people as individuals, gives positive recognition for achievement without discomfort to either party, adequately rewards and reinforces top performance, makes people feel like "winners," and avoids destructive comments about people at work.

In addition, this commitment stresses that the excellent manager gives developmental feed-back. The manager effectively analyzes performance, develops specific plans when performance needs improvement, strives to improve people's performance from acceptable to excellent, and gives development performance feed-back in a timely manner. Furthermore, this commitment stresses that the excellent manager encourages innovative ideas. The manager encourages suggestions for improving productivity, provides opportunities for others to try out new ideas, acts on ideas and suggestions from others in a timely manner, and avoids taking credit for the ideas of others.

The fifth commitment, the commitment to the task and mission, stresses that the excellent manager keeps the right focus. The manager knows and supports the mission of the overall organization, ties individual objectives to larger organization goals, concentrates on achieving what is most important, and places greater emphasis on accomplishing the mission than following procedures. In addition, this commitment stresses that the excellent manager keeps it simple. The manager keeps the work simple enough to be understood and implemented, breaks work into achievable components, encourages efforts to simplify procedures, and avoids unnecessary complications.

Furthermore, this commitment stresses that the excellent manager is action oriented. The manager communicates a positive sense of urgency about getting the job done, emphasizes the importance of day-to-day progress, encourages taking action to get things done, and concentrates on meeting deadlines.

This commitment also stresses that the excellent manager builds task importance. The manager is committed to excellence in task achievement, makes the task meaningful and relevant, encourages suggestions for improving productivity, and does not down-play the importance of the work.

The survey questions and data compilation are organized to reflect these commitments, to provide a framework against which to appraise performance and measure improvement.

A set of four styles of leadership rationale is included in the compiled data and the video vignettes, and complements the foregoing set of rationales. The four styles categorize leadership as: delegating; supporting; participating; guiding-coaching; or directing. Such categories serve to fill out the framework provided by the five commitments and thus provide a means for the user of the system 8 to relate and comprehend factors involved in improving performance.

Considering now the compiled information stored on the data diskette 16, the data received from the survey responses are compiled and organized according to the five commitments and the four styles. The compilation of stored information is produced using known means such as keying all survey responses into a suitably programmed data processing computer (not shown). The compilation is then delivered to the individual in computer-readable form on a suitable data delivery means such as a data diskette 16.

E. COMPUTER SOFTWARE

Referring now to FIGS. 9-19, there is shown a flow-chart of the computer software for the system 8. The double border of various ones of the boxes in the flow-chart, such as decision box 20 in FIG. 9, indicates a computer-generated function as opposed to user input or system displays.

Figure 9:
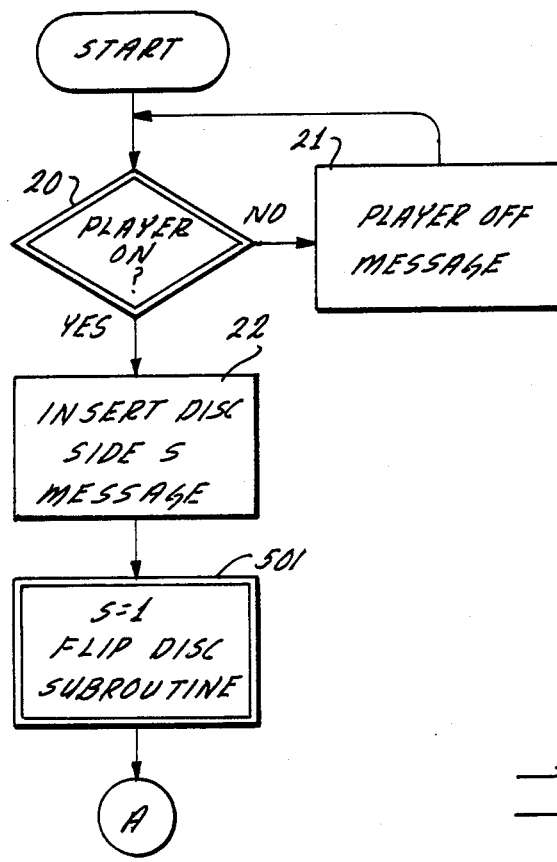

The videodisc/computer system is started with the presentation software stored in the data diskette 16 in the computer 9. As shown in FIG. 9, the operation commences with a check of the videodisc player 14. As shown in box 20, if the videodisc player 14 is not on, then the software prompts the user to turn on the videodisc player 14, as indicated in box 21. The software then initializes communications with the videodisc player 14.

As shown in box 22, if the videodisc player 14 is on, the system prompts the user via the monitor 12 to insert the videodisc 17 with side one up. The system 8 verifies that the proper videodisc side has been mounted before proceeding. If the wrong side has been mounted, the user is prompted to flip over the videodisc 17, according to the flip disc subroutine 501 as shown in FIG. 18.

Figure 10A:
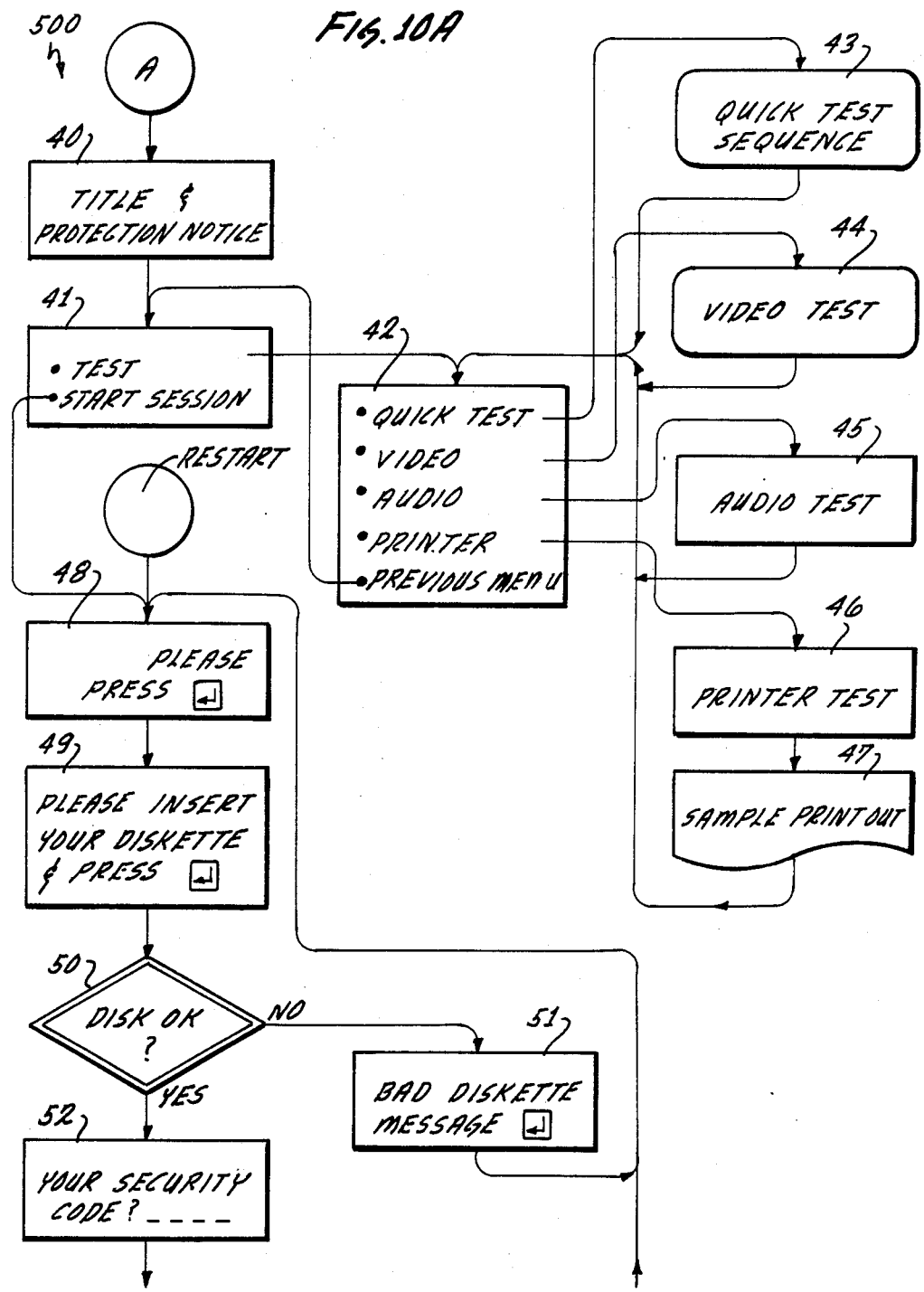

Once the proper videodisc side is playing, the system 8 displays a title screen including a legal protection notice as shown in box 40 in FIG. 10A.

To verify that a manager's experience in receiving feedback from the system 8 functions satisfactorily, proper system operation is first verified with a portion of the report presentation system that allows the test and setup of each of the system components.

The user selects the test option from menu indicated in box 41. Using test menu indicated in box 42, the system manager can quickly check all system components as indicated at 43, or individually check video settings as indicated at 44, audio level settings as shown at 45, as well as the printer at 46 and 47. If each of these components check out properly, then the system 8 is ready to present individual manager reports.

The operator exits the test sub-system by selecting the previous menu option from the menu as indicated at 42, and the start session option may then be selected from the menu at 41. This begins the session.

The report presentation is usually an individual private screening of the data and associated information. Each manager receiving data is introduced to the system 8 by the system operator who explains the operation of the system 8. This entails showing the manager the keys to be used, and the buttons to press when asked to flip over the videodisc 17.

As indicated in box 48, at the start of the session, the manager sees a welcoming screen from the computer, and a message to press the return key (not shown) on the keyboard 11, as shown on the monitor 12. Upon pressing the return key as shown in box 49, the manager is instructed to insert the data diskette 16 and press the return key. The system checks to see if there is a manager's report file on the diskette (question box 50). If the system cannot locate the required file, it provides error messages as indicated in box 41 and returns to the restart point of the system at box 48. This cycle is repeated until a diskette containing the expected file is inserted.

As indicated at box 52, if the required file is located, the system 8 then prompts for the manager's private code on the screen of the monitor 12. If the code number entered is incorrect (question box 53), the system provides a message to that effect (box 54) and returns to the restart point of the system (message box 48). This cycle is repeated until the correct code number is entered.

Once the correct diskette is inserted and the correct code number is entered by the user, the system commences analyzing the data on the manager's data diskette 16. This activity is referred to as setting the manager's path (activity box 55).

The system gathers the average scores for each of the 15 categories of the five commitments section and each of the four categories of the four styles section.

The system retrieves the manager's usage record from the diskette.

After the information is collected, the manager's presentation path is determined. To determine the presentation path, each average score is assigned one of four levels of presentation. The four levels system, are 4-high, 3-high neutral, 2-low neutral and 1-low.

The minimum score for a category is zero (0), and the maximum score is five (5). Each of the four presentation levels is assigned a range within the zero to five score range. Each of the 19 categories in turn is assigned to one of the four presentation levels bases on average score.

Once the presentation levels have been assigned for the five commitments, the software goes back and counts the number of low presentations. If the number of low presentations (level 1) exceeds a certain number (e.g., 5 out of 15), the system reassigns all but a certain number e.g., 5) of the low presentation assignments to low neutral (level 2) assignments.

This strategy prevents a manager having many low scores from seeing more than a certain number of low presentations. If the system has to make such a reassignment, it also sets a flag that is used by the software later, when printing out scores and action items.

The system checks to see if the manager's own survey data was available at the time the report was generated (question box 57). If it was not, it sets a flag (process box 56) indicating that there will be no data presented from the manager's point of view. The first time this flag is used is immediately after the data evaluation. If the flag indicating a lack of manager's data is set, the manager is informed by message displayed on the monitor 12 as indicated at 58.

As indicated by the branch decision box 59, if a manager is re-entering a session previously started, he is presented a sequence of menus (box 61) and sample menu as indicated at 62) that allow the manager to pick up where he or she left off or at any earlier point in the presentation.

Thus, the sample menu at 62 includes an asterisk to the left of each of the commitments that have been presented, and an arrow as a "bookmark" indicating where the presentation will resume when the session is re-entered. The remaining commitments are indicated by a dash mark appearing to the left of the commitment. The arrow points at "organ" in the sample menu at 62 to indicate this as the file re-entry point in the sample menu. This sample menu includes three boxes following the fifth commitment, "TASK", that prompt the user to use the up and down cursor control keyboard keys and the ENTER keyboard key to proceed through the menu.

If this is the manager's first time in the system (branch decision 59), the presentation starts with the introduction (video 60) and runs through each of the modules until the end.

The introduction then follows. The introduction at box 60 in FIG. 10b includes a linear video sequence from the videodisc player that introduces the program. After the sequence has played, the system updates the users record and proceeds with the five commitment introduction (indicated in the flowchart as "5C's").

The updating of the user's record is done throughout the presentation of the program. This record is stored on the user's diskette and is used to allow controlled reentry into the system by the user who wants to back up or reenter at a later date. This record basically indicates how far a user has gotten in the system.

The five commitments report ("5C's") immediatly follows the overall introduction. It begins in FIG. 11A at box 80 with an introduction to the five commitments, and after the introduction the user's record is updated.

The introduction is followed by a large loop that cycles five times, once for each of the five commitments. The loop's exit is through the "another C?" inquiry at 81. Assuming the answer is yes, the system proceeds to display the title of one of the five commitments as indicated at box 82, and a narrator's voice is used to announce the title of the particular commitment. As indicated at box 83, the title is followed by a video segment that constitutes the introduction for the particular commitment.

The system then enters another loop. This loop's length is dependent on the number of categories in a particular commitment. The number ranges between two and five depending on the particular commitment. As indicated at box 84, the first element in this loop is the category title, with accompanying voice over ("V.O."). The next element is a decision at 85 that decides what type of presentation this category will be given based on the category's assigned path value.

If the presentation path is 1 (a low score presentation), the system first shows the user's score with synchronized voice over and a comment indicating that this is an area in which the user could stand to improve. This aspect is illustrated in FIG. 11B at box 86, and it is followed by a video segment, as indicated at 87 that illustrates consequences likely to follow this particular performance trait of the user—a possible negative outcome of poor performance in this category.

As indicated at box 88, the user is then given suggestions for improvement by way of action items that pertain to the category. The user is then shown a positive example of what excellent performance in this category might mean, as shown at 89.

At box 90, the user is given the opportunity to continue to print the user's scores and action items, or to end the session. The system also automatically updates the user's record at this point. If the print option is chosen, then the print routine indicated at box 91 is initiated.

The print routine at 91 prints the user's scores in a format that is similar to that presented on the video screen. The appropriate action items are printed on a separate page. Additionally, if the user's scores were low enough to trigger a shifting of path values during path assignment, an extra line of text is printed on the printout. If the user takes the action items to a human resources development counselor, this extra line can be used by the counselor to call the user's attention to the fact that special treatment may be needed.

If the user selects "End Session" at the menu at box 90, the system proceeds to the end session routines.

If the path for the particular category is 2 (low neutral), the system starts by checking to see if there is an anomaly case to be considered. The anomaly check indicated at box 92 in FIG. 11B checks to see if any of the individual question scores within the category were especially low. If there were one or more especially low scores, then they are mentioned in the voice over of the score presentation indicated at box 93. If there were no especially low scores, then the prsentation at 94 is used. In either case, once the scores have been shown, the negative video vignette indicated at box 95 is used to indicate the possible ill effects of declining performance in this category. This is followed by a presentation of the action items at 96, and the video vignette at 97 showing the possibilities if action is taken, that is, consequences likely to accompany the suggested action. Once these steps have been performed, the system picks up with the menu at 90 from the level 1 presentation.

As previously described, if the path for the particular category is 3 (high neutral), the system begins by checking for the anomaly case. This is indicated at box 98 at FIG. 11C. Based on the test, the system presents scores with a high-neutral case voice over, with or without anomaly voice overs, as indicated in FIG. 11C at boxes 99 and 100. The system then presents the action items indicated at 101, and the video indicated at 102, showing the possibilities if action is taken. Once these steps have been performed, the system picks up with the menu indicating in FIG. 11B at box 90 from the level 1 presentation.

If the path for the particular category is 4 (high), the system begins by checking for the anomaly case indicated in FIG. 11C at box 103. Based on the test, the system presents scores with a positive voice over, with or without anomaly voice overs as indicated at 104 and 105. The system presents the video indicated at 106 showing the reaction if excellent performance is continued in this area. Once these steps have been performed, the system offers the menu indicated at 107 with options to continue, print scores, or end the session. At this menu, the system also updates the user's record. Selecting "End Session" takes the user to the end session routine, and selecting a printout moves the user to the print routine indicated at 108.

The print routine indicated at 108 prints out the user's scores in a similar format to the way they were presented on the video screen. Additionally, if the manager's scores were low enough to trigger a shifting of path values during path assignment, an extra line of text is printed on the printout. This is similar to the print routine indicated in FIG. 11B at box 91, except that no action items are printed.

Figure 11A:
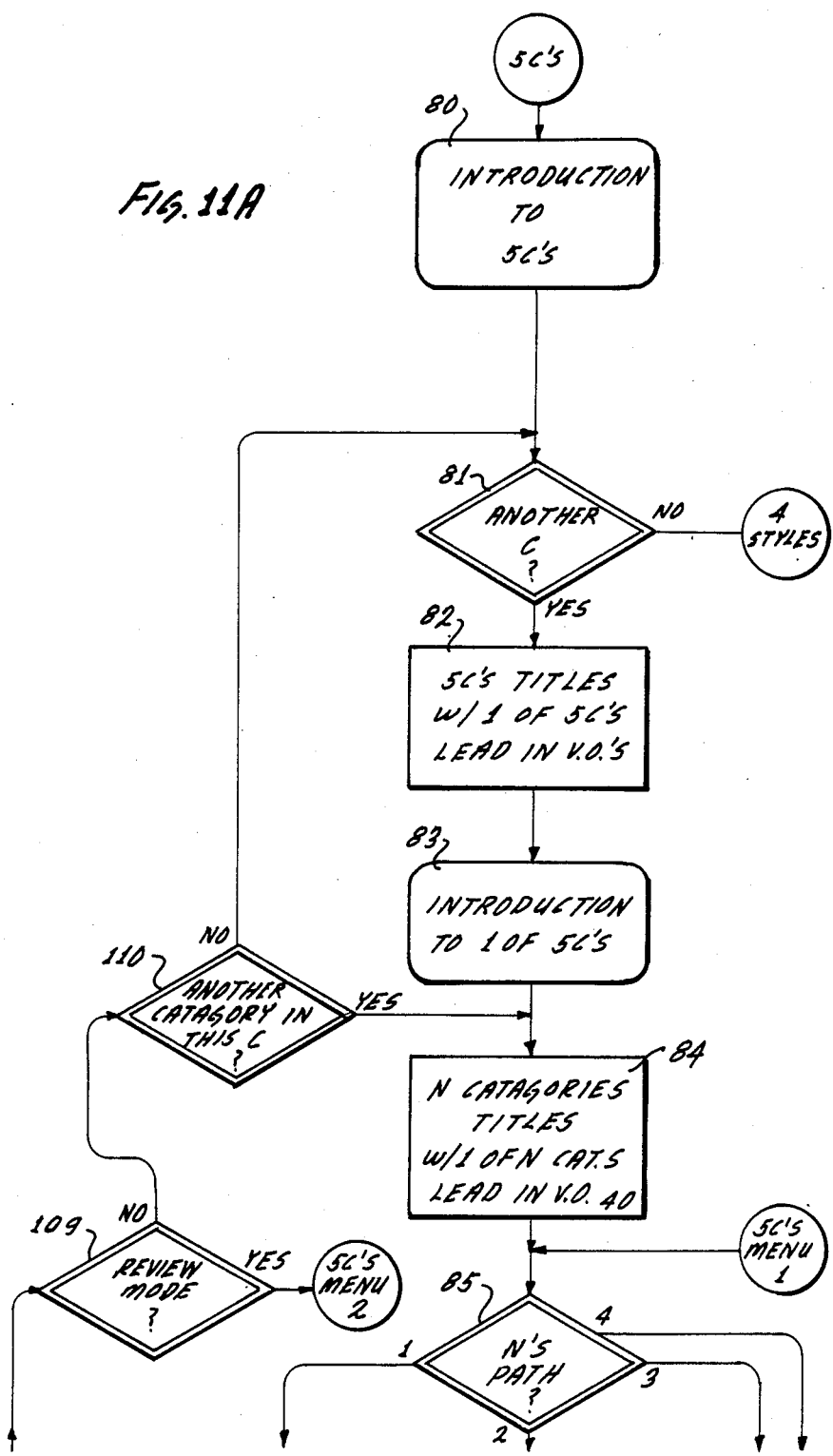
Figure 11C:
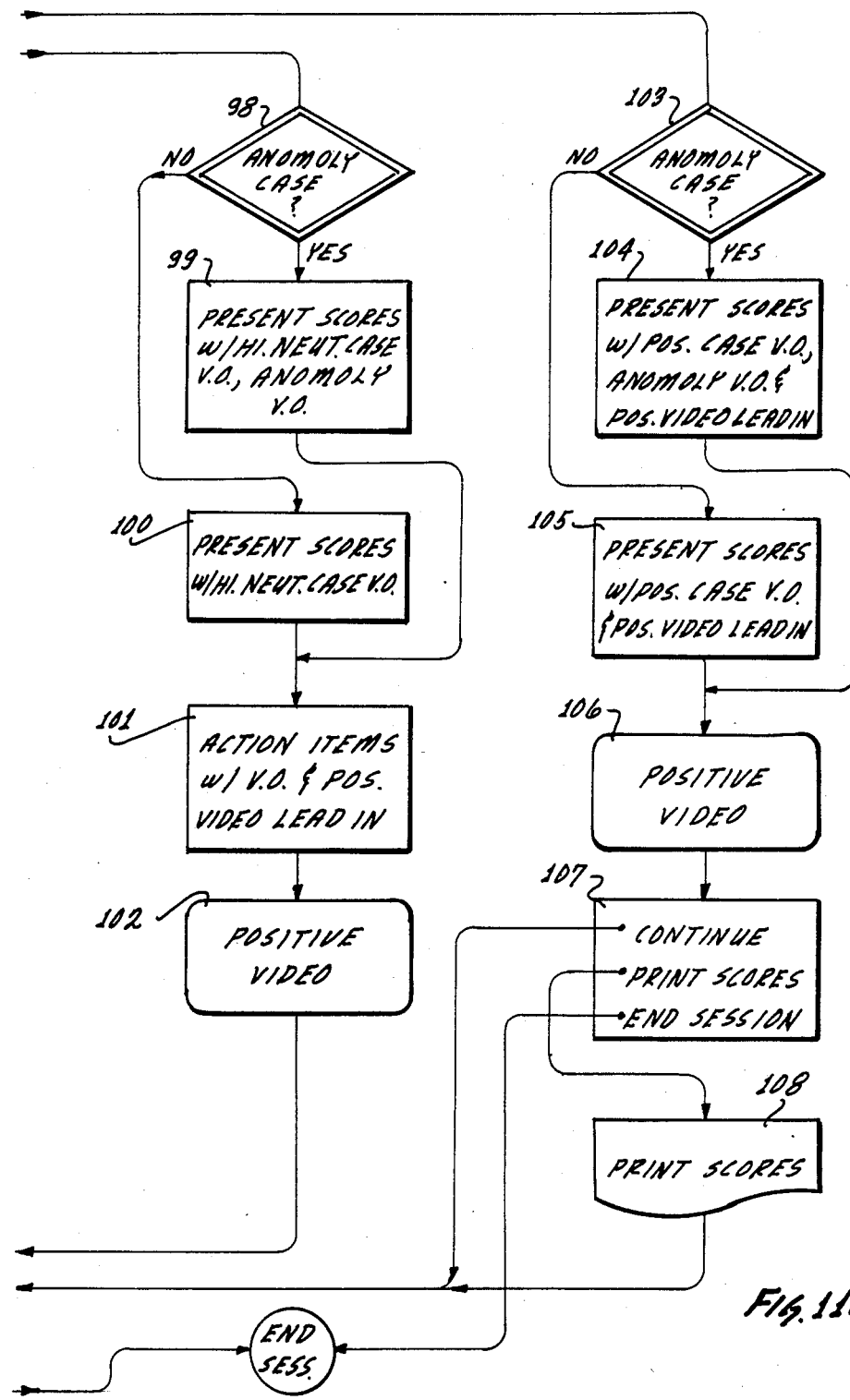

Selecting "Continue" from the menus indicated in FIG. 11B at box 90, or in FIG. 11C at 107, directs the system to consider a review mode as indicated in FIG. 11A at the decision box at 109. This is used to vector control back to the review system if the user is in the review section of the system. The first time through the system, the user will not be in the review mode and will therefore proceed to the loop control decision box in FIG. 11A at 110.

The loop control indicated at 110 continues to direct program flow to box 84 as long as there are other categories within the current commitment that the user has not yet seen. When the categories for a commitment are exhausted, control goes to the loop control indicated at 81. The loop control at 81 continues to direct program flow to box 82, as long as there are other commitments for the user to review. When there are no longer other commitments to review, the loop control at 81 directs program control to the four leadership styles report ("4 Styles").

As indicated in FIG. 12A at box 130, the four leadership styles report starts with an introductory video segment. After the introduction, the user's record is updated and the program enters the main loop for the four leadership styles report controlled by the decision indicated at box 131. At this point, the system checks to see if there are any more style presentations. If the answer is yes, the system proceeds to the title of the current style as indicated at box 32, with an accompanying voice over, and then proceeds to the introduction for the particular style as indicated at box 133. The system then checks to see what kind of presentation the person should get for the current style by the decision indicated at box 134.

Assuming the path for a particular leadership style is level 1 (low score presentation), the system proceeds to the presentation indicated in FIG. 12B at 135. The user's scores are presented along with style-specific commentary about the effect of low scores. Then the system provides the action items indicated at 136, with a voice over on how the manager can improve performance.

The presentation for each low scoring category is terminated with the menu indicated at box 137. The user is offered options to continue, to print scores and action items, or to end the session. When this menu is offered, the user's record is updated.

If the user selects "Print Scores and Action Items" from the menu at 137, the system proceeds to the print routine indicated at 138. This routine behaves similarly to the print routine in FIG. 11B at box 91 in the five commitments report loop.

If the user selects "End Session" from the menu at 137, the system proceeds to the end session routine that is described subsequently as part of FIG. 17.

If the user's path at the decision indicated at box 134, was 2 (low neutral), the system goes to the anomaly case test indicated at decision box 137 in FIG. 12B, and, depending on the result, proceeds to the presentations indicated at box 140 or 141. These presentations are similar to the style specific negative presentation at 135, except that the commentaries are low neutral in nature, and that the presentation at 143 also adds a comment regarding especially low scoring questions. After either of these presentations, the system goes to the action items presentation at 136.

If the user's path at the decision block at 134 was four (high), the system proceeds to the anomaly test indicated at 145. Based on this test, either the presentation at 146 or the one at 147 is given. The two present similar positive reinforcement for excellent performance, except that the presentation at 146 also gives commentary pointing out that there are some low scoring questions in this category. After either of these presentations, the system proceeds to the menu indicated at box 148, in which the user's record is updated and by which the user is given the choice of continuing, printing scores, or ending the session.

Selecting "Print Scores" at the menu at 148 causes the system to go to print routine at 149. This print routine is similar to the print routine at 138 except that no action items are printed out.

If the user selects "End Session" from menu 148, the system proceeds to the end session routine.

Selecting "Continue" at either the menu at 137 or the menu at 148, or completing the print routines at 138 or 149, causes the system to proceed to the switch indicated by the decision block at 150 in FIG. 12A. In the review mode, this allows return to the review menu system after viewing one of the styles. The first time the four leadership styles are viewed, this selects branching to switch indicated by box 131 indicated by box in FIG. 12A.

The switch at 131 controls the main loop for the four styles presentation. If the user has not yet viewed all four styles, the system branches to the title at 132. If all four styles have been viewed, the system branches to report X.

As indicated in FIG. 13A, report X is a summary report that provides the manager with a method of organizing needed improvements. The report starts with the video segment at 170 in FIG. 13A, in which a narrator explains the concept of the report. After this video, the system goes to the presentation at 171 in which the 15 categories in the five commitments are listed. The list is presented in order of the user's average scores with the categories, with the lowest scores at the top and highest scores at the bottom. The user can use this sorted list as a guide to help decide where to begin to modify behavior.

The narration continues into the presentation menu at 172, where the narrator explains that that the user has the options of reviewing any of the categories, proceeding to the four leadership styles report X ending report X, or ending the session.

Selecting one of the categories to review directs the system to the path branch at 173 in FIG. 13B.

If the path for the selected category is 1 (low), the system presents the category scores, with a voice over appropriate to negative scores, and proceeds to positive the video at 177.

If the path for the selected category is 2 or 3 (low neutral or high neutral), the system presents the category scores, with a voice over appropriate to neutral scores, and proceeds the to positive video at 177.

If the path for the selected category is 4 (high), the system presents the category scores, with a voice over appropriate to high scores, and proceeds to the positive video at 177.

The positive video at 177 presents a model of positive feedback for excellent performance in the given category.

The system then proceeds to the path branch at 178 in FIG. 13C. If the user's path at 178 is 1, 2 or 3 (low or neurtal), the branching goes to the action item presentation at 179, in which the voice over encourages change.

If the user's path at 178 in FIG. 13C is four (high), the system proceeds to the action item presentation at 180, in which the voice over continues to give positive reinforcement to the user's performance.

Both the action item presentation at 179 and the one at 180 branch to the menu at 181, which offers the options of continuing, getting a printout of scores and action items, or ending the session.

Selecting the printout option at the menu at 181 proceeds to the print routine at 182, which is similar to the print routine at 91 in FIG. 11B, except that the categories ranking number is added to the printout.

The menu at 181 includes an "End Session" option that directs the system to end the session routine.

Upon selecting the "Continue" option or the "Printout" option, the routine at 182 branches the system to the review mode switch at 183 in FIG. 13A. If the system is in the review mode, the system now returns to the review menu that called it. If the user is in report X for the first time, the system returns to the menu at 172 in FIG. 13A.

Selecting the "End of Report X" option in the menu at 172 in FIG. 13A branches to the end of report X routine. Selecting the "End Session" option in the menu at 172 branches to the end session routine. Selecting the "Four Styles" option in the menu at 172 causes the system to branch to the start of the four styles report X at the presentation at 190.

In the presentation at 190, the four categories in the four leadership styles are listed. The list is presented in order of the user's average scores with the categories, with the lowest scores at the top and highest scores at the bottom. Like the same lift for the five commitments, the user can use this sorted list as a guide to help decide where to begin to modify his behavior.

The narration continues into the presentation menu at 191 in FIG. 13A, where the narrator explains that the user has the options of reviewing any of the categories, returning to the five commitments report X, ending report X, or ending the session.

From the menu at 191 in FIG. 13A, selecting a review of one of the four categories branches to the path branch indicated in FIG. 13B at 192. If the path at 192 for the selected category is 1 (low), the system branches to the score presentation at 193, with voice over appropriate for low scores. From there, it goes to the path branch indicated in FIG. 13C at 196.

If the path in FIG. 13B at 192 for the selected category is 2 or 3 (neutral), the system branches to the score presentation at 194, with voice over appropriate for neutral scores. From there, it goes to the path branch indicated in FIG. 13C at 196.

If the path in FIG. 13B at 192 for the selected category is four (high), the system branches to the score presentation at 195, with voice over appropriate for high scores. From there, it does to the path branch indicated in FIG. 13C at 196.

If the user's path in FIG. 13C at 196 is 1, 2 or 3 (low or neutral), the branching goes to the ation item presentation at 197, in which the voice over encourages change.

If the user's path at 196 is four (high), then the system proceeds to the ation item presentation at 198, in which the voice over continues to give positive reinforcement to the user's performance.

Both the action item presentation at 197 and the one at 198 branch to the menu at 199, which offers the options of continuing, getting a printout of scores and action items, or ending the session. Selecting the printout option proceeds to the print routine at 200, which is similar to the print routine a 91, in FIG. 11B, except that the categories ranking number is added to the printout. Selecting the end session option directs the system to the end session routine.

Upon selecting the continue option or completing printout, the print routine at 200 branches the system to the review mode switch indicated in FIG. 13A at 201. If the system is in the review mode, the system now returns to the review menu that called it. If the user is in report X for the first time, the system returns to the menu at 191 in FIG. 13A.

Selecting the end report X option in the menu at 191 branches to the end report X routine indicated in FIG. 16. Selecting the end session option branches to the end session routine in FIG. 16. Selecting the five commitments option causes the system to branch back to the five commitments report X menu at 172 in FIG. 13A.

Selecting the end report X option from either the menu at 172, or the menu at 191 (FIG. 13A) updates the user record and branches to the menu indicated in FIG. 16 at 300, where the user is given the option of continuing, printing out report X, or ending the session.

Selecting the print option in the menu at 300 causes the printer to print out the X format reports for the five commitments and the four styles according to the print routine at 301. Additionally, the printer produces a report of the highest and lowest rated individual questions for the user. Selecting the end session option from the menu at 300 branches the system to the end session routine. Selecting the continue option, the completing print routine at 301 branches to the program summary and wrap up video at 302.

Figure 14B:
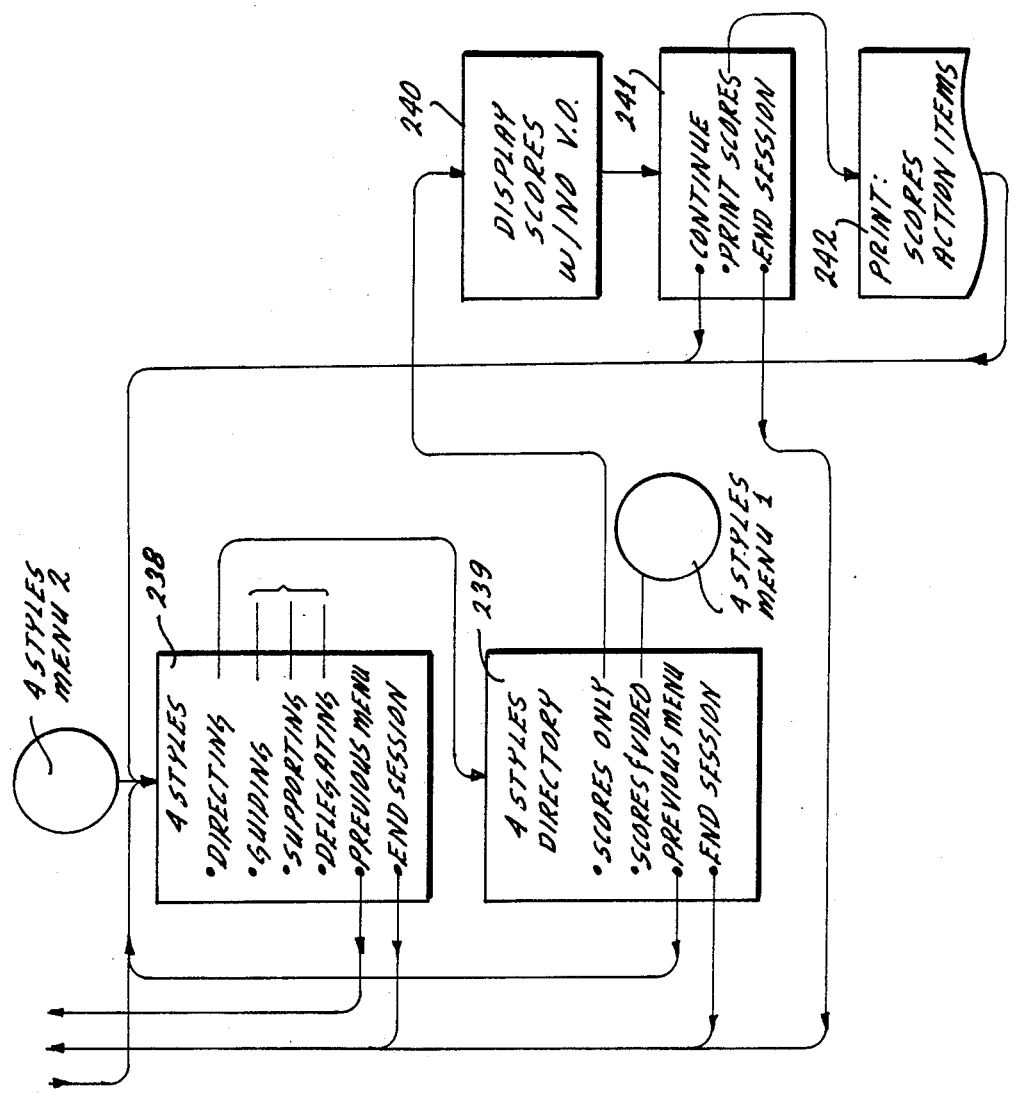
Figure 15B:
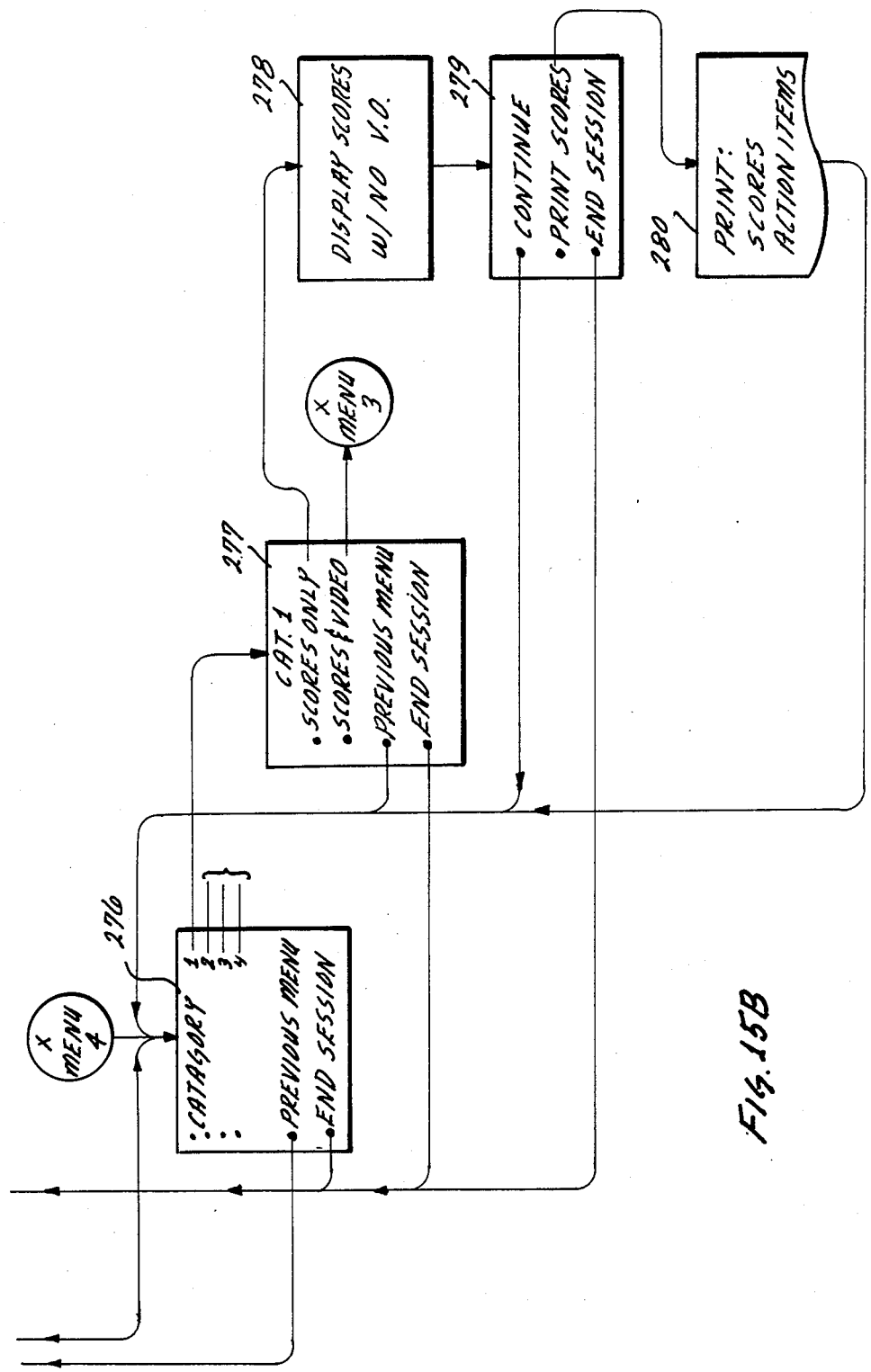

Once completed, the system branches to the review section of the system starting at the title screen indicated in FIG. 14A at 230. The review sub-system allows the user to review any data or portion of the system through a series of menus. The review starts with a title screen with explanatory voice over as indicated at 230, and, after the title, the system goes on to the main review menu at 231.

The main review menu offers the user choices of reviewing any of the three major sections of the report (five commitments, four styles, or report X), or ending the session. If the user selects the end session option from any of the menus in the review section (231, 232, 233, 234, 236, 238, 239, 241, 270, 271, 272, 274, 276, 277, or 279), the system branches to the end session routine.

The system of hierarchical menus used in the review section (231, 232, 233, 234, 236, 238, 239, 241, 270, 271, 272, 274, 276, 277, and 279 are given as examples) allows the user to get to any section of any of the reports and repeat presentations already given. Additionally, the user may view only the data portions of presentations and get printouts that were missed earlier (234–237, 239–242, 272–275, and 277–280 are given as examples).

To exit the review sub-system the user selects the end session option from any of the menus. The end session routine indicated in FIG. 17 first presents the user with the menu at 330, allowing the user to either end the session or re-enter the session. If the user decides to re-enter the session, the software branches back to the decision block at 61 in FIG. 10B, where the system determines what sequence of menus (e.g., 62) should be offered to the user based on the compiled information record previously displayed.

If the user elects to end the session, the system prompts the user to reset the status of the system to be the way it was when he started. The first step in this is accomplished by the question in FIG. 17 at 334. If the system is currently playing side 1 of the videodisc, then the system proceeds to the message at 333. If the system is currently playing side 2 of the videodisc, then the system proceeds to the message at 331, which prompts the user to flip over the videodisc before ending the session. Proper execution of this request is assured by the flip disc subroutine.

Once the system knows it is playing side-1, it prompts the user to remove the floppy diskette by the message at 333.

When the user's floppy diskette has been removed, the system recycles to the entry point message for a new user indicated in FIG. 10A at box 48. Restarting the system at box 48 represents a complete feedback loop for a user. The system can continue to process as many people as wish to use it.

The videodisc/computer system plays audio and video from both sides of a videodisc. Before playing an audio or video segment, the system checks to be certain that the right side is currently playing. If the correct side is not playing, the system prompts the user to flip the videodisc and then uses the flip disc subroutine indicated by the flowchart comprising boxes 501 through 509 in FIG. 18. This ensures correct execution of the request.

Once the user has flipped the videodisc over, the system responds with the messsage at to wait while the videodisc player comes up to speed. Once at speed, the player loads and executes the program from the videodisc itself that is indicated by boxes 600 through 603 in FIG. 19.

If the player was successful in loading and executing its program, the answer to the question at 503 in FIG. 18 would be yes and the system would proceed to the question at 508. If the answer to the question at 508 is yes, the subroutine terminates. If the answer is no, the system proceeds to the message at 506, which informs the user that the side playing is not the one needed, and it follows with the message at 507, instructing the user how to flip the videodisc over. The system then loops back to the start of the subroutine.

If the answer to the question at 503 was no (the system cannot automatically determine the current side number), the system falls back on a manual method of side number identification initiated by the video as indicated at 504.

If the correct videodisc side is currently playing, the message for the video at 504 requires the user to press the return key on the keyboard. If the wrong videodisc side is currently playing, the message for the video at will ask the user to press the escape key on the keyboard.

If the answer to the key input question at 505 is return, then the subroutine terminates. If the answer to the key input question is escape, then the system proceeds to the message at 506 and repeats the request to flip the videodisc.

The system continues to request videodisc flipping as long as the wrong videodisc side is loaded.

F. VIDEODISC SOFTWARE

Each of the two videodisc sides has the unique software program indicated by boxes 600 through 603 that is used to help identify the current videodisc side.

Each program starts out by defining segment definitions. This is followed by cueing the videodisc to the first frame of the first segment and terminating the program.

The only difference between the two programs is the definition of the first segment. On side one the first frame of segment one is 310. On side two the first frame of segment one is 320. The system software identifies the side number by allowing the player program to run and then requesting the current frame number. If the frame number is 310, the system knows the videodisc is playing side 1. If the frame number is 320, the system knows the videodisc is playing side 2. If the system does not get one of those two frame numbers (or numbers in close range to those numbers), it reverts to its manual method of determination described in the flip disc subroutine.

Besides the first segment definitions used to determine side number, the system also defines other segments that can be cued by the system to determine such information as product number, version number, client number or other useful identification number.

The foregoing describes software that can be coded by one of reasonable skill in the art using the foregoing description and accompanying flowchart.

G. ALTERNATIVE SYSTEM

Referring now to FIG. 20, there is shown an adapter cable 701 of another performance appraisal and training system 703, which is also constructed in accordance with the present invention, and which is similar to the system 8, except for the cable 701 and except that the IBM PC personal computer 9 is replaced with a hard-disk personal computer (not shown), such as the one manufactured by IBM Corporation of New York and sold under the trade name "IBM PC-XT."

The cable 701 is used in place of the cable 18, since the hard-disk computer does not have an auxiliary cassette port normally used for switching information. In this regard, the cable 701 connects between the videodisc player (not shown) of the system 703, and a second printer port (not shown), designated LPT:2, for the IBM-XT computer, to assert control over the switching function.

The cable 701 includes two wires designated 701A, interconnecting a video cable 5 pin D.I.N. female connector 705 adapted to engage electrically with a videodisc player port (not shown), and a computer DB-25 male connector 707, according to the pin connections as illustrated.

As various changes may be made in the form, construction, and arrangement of the procedures and parts described herein, without departing from the spirit and scope of the invention and without sacrificing any of its advantages, all matter herein is to be interpreted as illustrative and not in any limiting sense.

What is claimed is:

1. An instructional feedback system, comprising:
   survey means for presenting a group of inquiry indicia and for storing corresponding groups of response signals;
   data delivery means for providing computer readable data indicative of compiled response signals from the user;
   means for storing limit signals corresponding to predetermined limits individually associated with said groups of compiled response data;
   means for comparing said response data with corresponding ones of said limit signals to generate request signals;
   feedback presentation memory means storing prerecorded feedback signals indicative of a group of vignettes presenting various informative situations to the user when certain of said limits occur; and
   means responsive to said request signals for causing the retrieval of selected ones of said feedback signals, for presenting to the user selected corresponding ones of stored vignettes to illustrate said situations.

2. A system as recited in claim 1, wherein the survey means comprises:
first survey means for enabling a selected user to record in private a series of self-appraisal responses to a series of performance appraisal questions; and
second survey means for enabling each member of a group of other individuals to record in private a series of other responses to a related series of questions.

3. A system as recited in claim 1, wherein the data delivery means comprises:
a data diskette on which is recorded a computer-readable compilation of the performance appraisal data.

4. A system as recited in claim 1, wherein the feedback presentation memory means comprises:
a computer-controllable videodisc player; and
connecting means for connecting the player to an existing computer system.

5. A system as recited in claim 4, wherein the connecting means includes:
a cable adapted to be connected between the videodisc player and an output port on a personal computer.

6. A system as recited in claim 1, wherein the feedback presentation means includes:
a program storage medium on which is stored programming instructions enabling computer-controlled production of a video presentation from selected ones of the group of motion picture vignettes according to the performance appraisal data.

7. A system as recited in claim 6, wherein the program storage medium comprises a program diskette suitable for use with a conventional personal computer.

8. A system as recited in claim 1, further comprising:
a personal computer with a video monitor.

9. A system as recited in claim 1, further comprising:
videodisc player means for enabling computer-controlled selection of selected ones of the vignettes; and
connecting means for connecting the recorder to a specified computer system.

10. An instructional feedback system, comprising:
means for storing a series of motion picture vignettes descriptive of a plurality of consequences accompanying a variety of performance traits;
survey means for presenting a plurality of questions individually to one or more survey participants and for recording a response to each question for enabling procurement of performance appraisal data indicative of one of the variety of performance traits characteristic of a user;
data delivery means for providing performance computer readable data indicative of compiled performance data of the user;
means for storing limit signals corresponding to predetermined limits individually associated with said groups of compiled response data;
means for comparing said response data with corresponding ones of said limit signals to generate request signals;
presentation means responsive to said request signals for enabling user review of selected motion picture vignettes descriptive of the performance trait to be displayed indicated by the performance appraisal data utilizing a computer system and a computer-readable compilation of the performance appraisal data.

11. A system as recited in claim 10, wherein the survey means comprises:
first survey means for enabling a selected user to record in private a series of self-appraisal responses to a series of performance appraisal questions; and
second survey means for enabling each member of a group of other individuals to record in private a series of other responses to a related series of questions.

12. A system as recited in claim 10, further comprising:
a data diskette on which is recorded a computer-readable compilation of the performance appraisal data.

13. A system as recited in claim 10, further comprising:
a computer-controllable videodisc player; and
connecting means for connecting the player to an existing computer system.

14. A system as recited in claim 13, wherein the connecting means includes:
a cable adapted to be connected between the videodisc player and an output port on a personal computer.

15. A system as recited in claim 10, wherein the feedback presentation means includes:
a program storage medium on which is stored programming instructions enabling computer-controlled production of a video presentation from selected ones of the vignettes according to the performance appraisal data.

16. A system as recited in claim 15, wherein the program storage medium comprises a program diskette suitable for use with a conventional personal computer.

17. A system as recited in claim 10, further comprising:
a personal computer with a video monitor.

18. A system as recited in claim 10, further comprising:
videodisc player means for enabling computer-controlled selection of selected ones of the vignettes; and
connecting means for connecting the player to a specified computer system.

19. A method of instructing a user comprising:
presenting a group of inquiry indicia and for storing corresponding groups of response signals;
providing computer readable data indicative of compiled response signals from the user;
storing limit signals corresponding to predetermined limits individually associated with said groups of compiled response data;
comparing said response data with corresponding ones of said limit signals to generate request signals;
storing prerecorded feedback signals indicative of a group of vignettes preventing various informative situations to the user when certain of said limits occur; and
for causing the retrieval of selected ones of said feedback signals in response to said request signals, for presenting to the user selected corresponding ones of stored vignettes to illustrate said situations.

20. A method as recited in claim 19, including the steps of:
using a program diskette containing computer instructions suitable for a selected computer system.

21. A method as recited in claim 19, including the steps of:
using a videodisc on which the motion picture vignettes are recorded; and
using a videodisc player suitable connected to an available computer system.

* * * * *